(12) United States Patent
Maeno

(10) Patent No.: US 8,205,086 B2
(45) Date of Patent: Jun. 19, 2012

(54) WATERMARK INFORMATION EMBEDDING DEVICE AND METHOD, WATERMARK INFORMATION DETECTING DEVICE AND METHOD, WATERMARKED DOCUMENT

(75) Inventor: Kurato Maeno, Saitama (JP)

(73) Assignee: Oki Data Corporation, Tokyo (JP)

( * ) Notice: Subject to any disclaimer, the term of this patent is extended or adjusted under 35 U.S.C. 154(b) by 829 days.

(21) Appl. No.: 10/553,737

(22) PCT Filed: Mar. 12, 2004

(86) PCT No.: PCT/JP2004/003357
§ 371 (c)(1),
(2), (4) Date: Oct. 20, 2005

(87) PCT Pub. No.: WO2004/095828
PCT Pub. Date: Nov. 4, 2004

(65) Prior Publication Data
US 2006/0236112 A1 Oct. 19, 2006

(30) Foreign Application Priority Data
Apr. 22, 2003 (JP) ................................. 2003-117061

(51) Int. Cl.
*G06F 21/00* (2006.01)
(52) U.S. Cl. .............................. 713/176; 380/46; 380/54
(58) Field of Classification Search .................. 382/100, 382/250; 375/130, 133, 135, 145, 296; 380/46, 380/54; 348/473
See application file for complete search history.

(56) References Cited

U.S. PATENT DOCUMENTS

| 5,912,972 | A | * | 6/1999 | Barton | 713/176 |
|---|---|---|---|---|---|
| 5,915,027 | A | * | 6/1999 | Cox et al. | 380/54 |
| 5,982,892 | A | * | 11/1999 | Hicks et al. | 705/51 |
| 6,031,914 | A | * | 2/2000 | Tewfik et al. | 380/54 |
| 6,058,243 | A | * | 5/2000 | Ogino et al. | 386/94 |
| 6,134,659 | A | * | 10/2000 | Sprong et al. | 713/190 |
| 6,735,699 | B1 | * | 5/2004 | Sasaki et al. | 726/28 |
| 6,768,807 | B1 | * | 7/2004 | Muratani | 382/100 |
| 6,889,211 | B1 | * | 5/2005 | Yoshiura et al. | 705/58 |
| 7,260,722 | B2 | * | 8/2007 | Forstrom et al. | 713/176 |
| 7,366,300 | B2 | * | 4/2008 | Qi et al. | 380/29 |
| 2002/0054355 | A1 | | 5/2002 | Brunk | |
| 2003/0021442 | A1 | * | 1/2003 | Suzaki | 382/100 |

FOREIGN PATENT DOCUMENTS

| EP | 0840513 A | 5/1998 |
|---|---|---|
| JP | 6-334841 | 12/1994 |
| JP | 9-179494 | 7/1997 |
| JP | 10-145757 | 5/1998 |
| JP | 11-041571 A | 2/1999 |
| JP | 2000-152195 | 5/2000 |
| JP | 2000-232631 | 8/2000 |
| JP | 2002-82612 | 3/2002 |
| JP | 2003-101762 | 4/2003 |
| KR | 2000-0035263 A | 6/2000 |
| WO | WO-02/21846 A | 3/2002 |

* cited by examiner

*Primary Examiner* — Kim Vu
*Assistant Examiner* — John B King
(74) *Attorney, Agent, or Firm* — Rabin & Berdo, P.C.

(57) ABSTRACT

The present invention is relate to watermark information embedding apparatus and method for the same, watermark information detecting apparatus and method for the same, and method of containing watermark document. A document image generator (101) generates a document image according to document data (105). A watermark image generator (102) generates a watermark image. The watermark information (106) is denoted with dot pattern, and the dot pattern within the outline of the watermark information are of special value. A synthesizer (103) overlaps document image generated from the document image generator (101) and the watermark image generated from the watermark image generator (102) so as to generate a containing watermark document image.

22 Claims, 31 Drawing Sheets

UNIT E

UNIT A

UNIT B ( 1 ) UNIT IMAGE

▨ UNIT A ( SYMBOL 0 )

■ UNIT B ( SYMBOL 1 )

☐ UNIT E ( WITHOUT SYMBOL )

UNIT IMAGE ( 2 )

UNIT IMAGE ( 3 )

UNIT IMAGE OF SYMBOL 0

UNIT IMAGE OF SYMBOL 1

(1)

(2)

PN CODE A

PN CODE B

■ 1
□ 0

PN CODE C

THREE-DIMENSIONAI CODE

PN CODE C ⟶ PN CODE A

PN CODE B

THREE-DIMENSIONAI CODE

WATERMARK INFORMATION EMBEDDING DEVICE AND METHOD, WATERMARK INFORMATION DETECTING DEVICE AND METHOD, WATERMARKED DOCUMENT

FIELD OF THE INVENTION

The invention relates to method and apparatus for embedding watermark information in document images; and associated method and apparatus for detecting such watermark information from the document images with watermark information embedded therein according to the method and apparatus for embedding watermark information; and document containing watermark.

BACKGROUND OF THE INVENTION

A digital watermark, which is traditionally associated with a document, is embedded for preventing from being copied and forged, usually in a manner not alerting human viewers that such information is present. Such meta-information embedded in the digital watermark is particularly the case that stored and transmitted in relation to digital media and not easy to be decreased or vanished. Thus, such meta-information can be detected robustly and reliablely. Similarly, it is necessary to provide methods and systems for verifying the authenticity of paper media, such as documents and articles. The document or article should be inconspicuously embedded confidential structure characteristic of meta-information therein in order to provide reasonable security against forgery Conventionally, as disclosed in Official Gazette of Japanese Patent Application Laid-Open No. 09-179494, confidential information to be recorded is binarized into blocks. The confidential information is denoted with data of distances (or pixels) between reference point marks and position discrimination marks.

However, in the above mentioned conventional technique, the image inputted by a scanner or other input apparatus must be accurately manipulated at the granularity of a single pixel during detecting process. If there is any spot on the paper or noise interference during printing or reading, that will give birth to a great influence on information detecting.

Moreover, in the above mentioned conventional technique, when scanning the print document into a computer by a scanner or other input apparatus, and detecting the confidential information, the inputting image will contain lots of interference noise components because of the spots on the print document introduced in printing and rotation distortion introduced in scanning, thereby causing the confidential information hardly to be read correctly.

BRIEF SUMMARY OF THE INVENTION

The invention is made in consideration of the above problems and it provides following preferable configuration.

In accordance with a first aspect of the invention, a watermark information embedding apparatus comprises a document image generating section for generating a document image; a watermark image generating section which uses dot pattern to denote watermark information, and generates watermark image in which an outline of recording area of the watermark information is denoted by dot pattern indicating special value; and a synthesizing section for overlapping the document image and the watermark image so as to generate a containing watermark document image.

In accordance with a second aspect of the invention, a watermark information embedding apparatus comprises a document image generating section for generating a document image, a PN code generating section for generating PN code, a watermark image generating section for diffusing prescript watermark information by using the PN code, generating diffusing watermark information and generating a watermark image in which the diffusing watermark information is denoted by dot pattern, and a synthesizing section for overlapping the document image and the watermark image so as to generate a containing watermark document image.

Preferably, in accordance with the second aspect of the invention, the PN code generating section generates at least one PN code, and the watermark image generating section utilizes the at least one PN code to diffuse the prescript watermark information with respect to row unit or column unit.

Preferably, the PN code generating section generates two-dimensional PN code which is different from or is same with that representing row direction and column direction respectively.

In accordance with a third aspect of the invention, a watermark information embedding apparatus comprises a document image generating section for generating a multipage document image, a PN code generating section for generating three-dimensional PN code which is different from or is same with that representing row direction, column direction and page direction respectively, a watermark image generating section for generate a multipage watermark image, and a synthesizing section for overlapping the multipage image and corresponding watermark image so as to generate a containing watermark document image. Wherein the PN code generating section generates two-dimensional PN code which is configured by PN codes with respect to row direction and column direction according to prescript watermark information. The watermark image generating section uses the two-dimensional PN code to diffuse the prescript watermark information so as to generate the watermark image of one page, and uses the PN code in the page direction to diffuse so as to generate the multipage watermark image.

Preferably, the multiple dot pattern are configured in one surface, and wherein there is at least a dot pattern representing special watermark information.

In accordance with a fourth aspect of the invention, a watermark information detecting apparatus for extracting watermark information, which being represented as a watermark image having multiple dot pattern configured in one surface thereof, from a document comprises a watermark information detector. The watermark information detector discriminates area of the watermark information according to detected outline representing special value.

In accordance with a fifth aspect of the invention, a watermark information detecting apparatus for extracting watermark information, which is diffused by PN code and represented as a watermark image, from a document comprises a watermark detector. The watermark information detector extracts the watermark image from the document, and estimates area of the watermark information via calculating correlation between the watermark image and the PN code.

Preferably, the watermark detector discriminates whether the watermark information is correctly detected according to correlation peak value of the PN code, if the watermark information can't be detected correctly, the watermark detector performing prescript correction.

Preferably, the watermark detector calculates correlation values using different PN codes, detects correlation peak value of each PN code, and estimates row address and column address according to the correlation peak value.

Preferably, the watermark detector calculates correlation of two-dimensional PN code, which includes different kinds of PN codes in row direction and column direction respectively, so as to estimate the area of the watermark information.

Preferably, the document is composed by multipage. The watermark detector calculates correlation of three-dimensional PN code, which includes different kinds of PN codes with respect to row direction, column direction and page direction, so as to estimate the area of the watermark information.

Preferably, the multiple dot pattern are configured in one surface, and wherein there is at least a dot pattern representing special watermark information.

In accordance with a sixth aspect of the invention, a method of embedding watermark information comprises following steps: representing the watermark information with dot pattern by a watermark information embedding apparatus; generating a watermark image by using dot pattern representing special value to represent a outline of a watermark information area; and generating a containing watermark document image by overlapping the watermark image and the prescript document image.

In accordance with a seventh aspect of the invention, a method of embedding watermark information comprises following steps: generating a watermark image through utilizing a watermark information embedding apparatus to diffuse prescript watermark information by PN code; synthesizing the watermark image and prescript document image so as to generate the synthesized image; and outputting the synthesized image.

Preferably, the multiple dot pattern are configured in one surface, and wherein there is at least a dot pattern representing special watermark information.

In accordance with a eighth aspect of the invention, a method of detecting watermark information for utilizing a watermark information detecting apparatus to extract watermark information, which is represented as a watermark image having multiple dot pattern configured in one surface thereof, from a document. The method comprises the steps of: detecting a outline representing special value from the watermark image; and estimating the area of the watermark information according to the outline.

In accordance with a ninth aspect of the invention, a method of detecting watermark information for utilizing a watermark information detecting apparatus to extract watermark information, which is diffused by PN code and represented as a watermark image, from a document. The method comprising the steps of: extracting the watermark image; calculating correlation between the watermark image and the PN code; and estimating the area of the watermark information according to previous steps.

Preferably, the multiple dot pattern are configured in one surface, and wherein there is at least a dot pattern representing special watermark information.

In accordance with a tenth aspect of the invention, a method for generating a containing watermark document comprises following steps: generating a watermark image by using PN code to diffuse prescript watermark information; and synthesizing the watermark image and prescript document.

BRIEF DESCRIPTION OF THE DRAWINGS

The invention is explained in further detail, and by way of example, with reference to the accompanying drawings wherein.

DETAILED DESCRIPTION OF THE PREFERRED EMBODIMENT

First Embodiment

A first embodiment in the present invention has been made to solve the aforementioned problems, and collocates with special value of signal image in a outline of a watermark information area. For example, in the first embodiment, the signal image denoting "1" is configured around the outline of the watermark information area.

Figure 1:
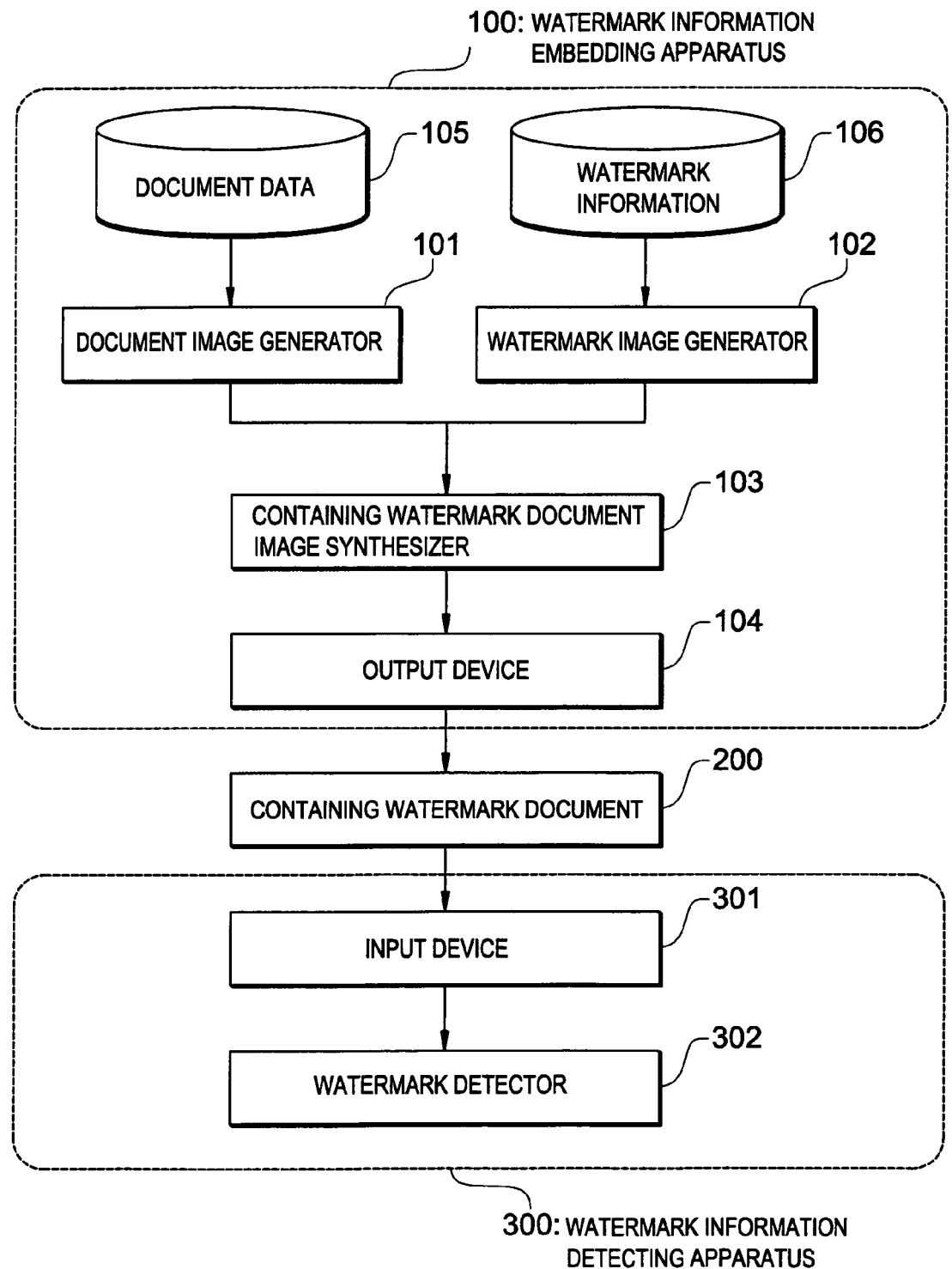
FIG. 1 is a block diagram of a watermark information embedding apparatus and a watermark information detecting apparatus in a first embodiment according to the present invention.

FIG. 1 is a block diagram depicting a watermark information embedding apparatus and a watermark information detecting apparatus in the first embodiment according to the present invention. A system apparatus shown in FIG. 1 comprises a watermark information embedding apparatus 100 and a watermark information detecting apparatus 300. A document containing watermark information 200 is outputted by the watermark information embedding apparatus 100 and serves as a detecting object of the watermark information detecting apparatus 300.

The watermark information embedding apparatus 100 is substantially a computer, which can generate document image according to data and watermark information embedded in the document, and then print them in paper media. The watermark information embedding apparatus 100 comprises a document image generator 101, a watermark image generator 102, a containing watermark document image synthesizer 103 and an output device 104. Document data 105 is generated by document generating instruments. Watermark information 106 is perceptually invisible messages embedded in paper media content such as symbol array, video or audio data except for word. The document data 105 and watermark information 106 are stored in memorizer, such as hard disk or semiconductor storage, and can be read in from external through network port.

The document image generator 101 is a functional device performing for transforming the document data 105 into a document image and printing the image on a paper media. To be specific, white pixel area in the document image is a blank area during printing, black pixel area in the document image is an area that coated with black dope. In following descriptions about preferable embodiments of the present invention, printing technologies employ black ink (single color). However, the present invention is not limited to this, printing technologies employing multicolor can also be applied.

The watermark image generator 102 is provided for encoding the numerical value N (N>=2) digitized from the watermark information 106, and distributing each symbol of the code into corresponding prepared signals. The signals utilize arranging dots in rectangle area of random size to represent wave of random direction and wavelength. Then the signals distribute corresponding symbols to the direction of wave and the wavelength. The watermark image is configured by configuring such signals to the image according to a certain rule. In other words, the watermark image generator 102 has a function that generating the watermark information 106 as a dot pattern. A detailed description about the watermark image generating process will be given hereinbelow.

The containing watermark document image synthesizer 103 is provided to overlap the document image and the watermark image thereby generating the containing watermark document image. The containing watermark document image synthesizer 103 generates the containing watermark document image from the dot pattern denoted with special value. The special value represents a outline of an area of the watermark information in the watermark image.

The output device 104 is substantially a printer for printing and outputting the containing watermark document image. The document image generator 101, the watermark image generator 102 and the containing watermark document image synthesizer 103 can realized as one function of a print driver or by individual software.

The containing watermark document 200 (that is, the watermarked document) is a document in which the watermark information 106 is embedded in the original document data 105. The dot patterns of the watermark image appear as shading in the document image.

The watermark information detecting device 300 is provide to recognize the watermark information embedded in the containing watermark document 200. The watermark information detecting device 300 includes an input device 301 and a watermark detector 302.

The input device 301 is substantially a scanner, which is provided to read the image on the containing watermark document 200 as multi-luminance gray images. The watermark detector 302 is provided to filter the input image, detect the embedded signal, revert symbol to the detected signal, and extract the embedded watermark information. Moreover, the watermark detector 302 has a function that can discriminate the outline of the watermark information area and define the area configured by the outline of the watermark information as a record area of the watermark information when detected an area with continuous special value from the signal.

Following is a detailed explanation about the flows of the watermark information embedding apparatus 100 and the watermark information detecting apparatus 300. Now, description about the watermark information embedding apparatus 100 is given.

First to the document image generator 101, the document data 105 is generated by a word processing software and so on, and contains font and collocation information. The document image generator 101 generates image of every page according to the document data 105 printed on the papers. The document image is a two-value image of black and white. The white pixels (value=1) are taken as background, and the black pixels (value=0) are taken as word area (ink painting area).

Then to the watermark image generator 102, the watermark information 106 includes symbol data, video data, audio data and so on. The watermark image generator 102 generates the watermark image overlapping the background of the document image from the above mentioned data.

Figure 2:
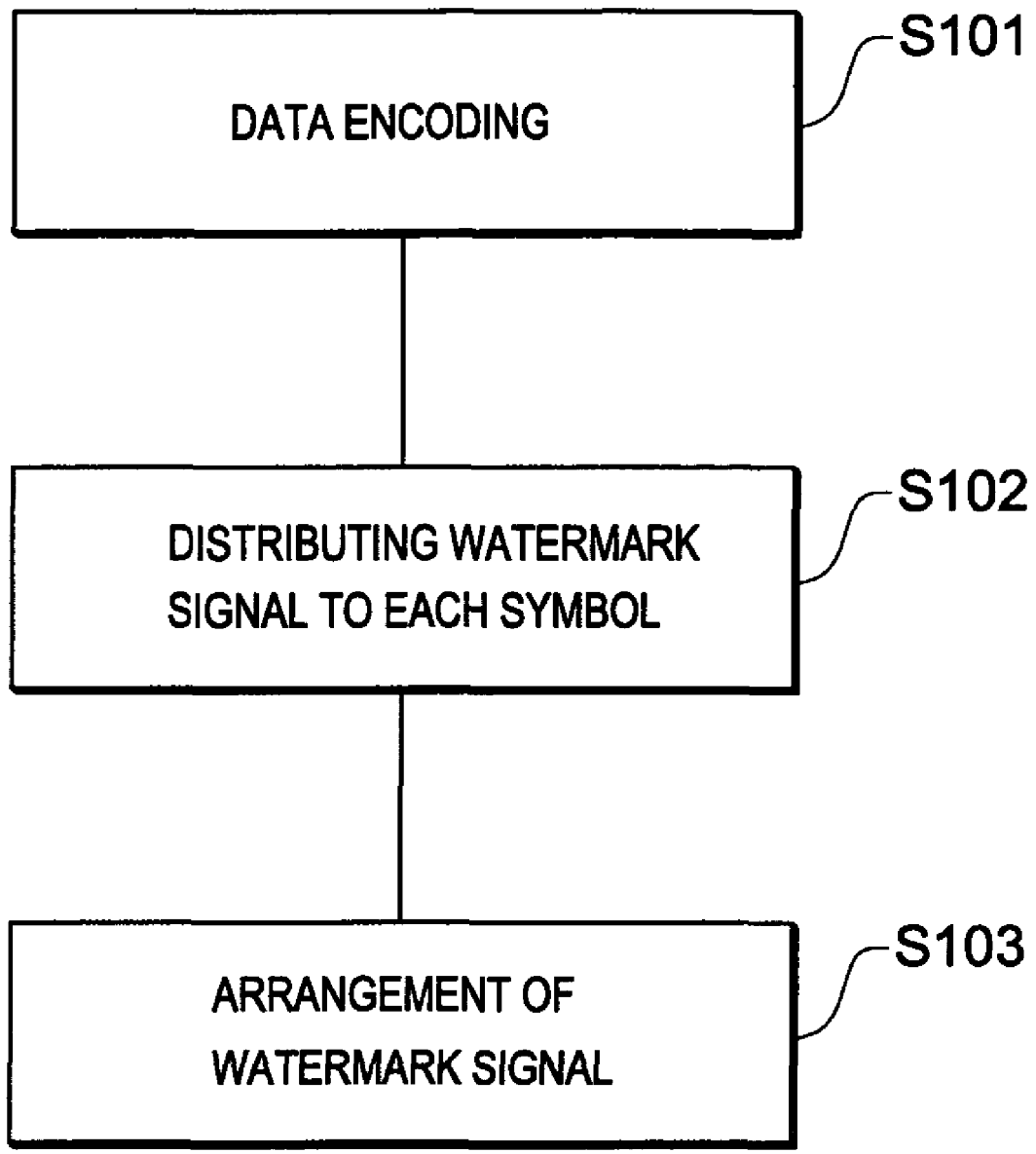
FIG. 2 is a flow chart showing steps of a watermark image generator appear in FIG. 1.

FIG. 2 is a flow chart of the watermark image generator 102. Referring to FIG. 2, the watermark image generator 102 includes following three steps.

Firstly, step S101, which is provided to transform the watermark information 106 into N metacode. N can be a random number. In order to explain conveniently, it is supposed that N=2 in the first embodiment. Therefore, the step S101 will generate binary code, which is represented as bit array of 0 and 1. In the step S101, the data can be encoded directly, and can also be encoded into encrypted data.

Secondly, step S102, which is provided to distribute the watermark signal to each symbol of the code. The watermark signal utilizes arranging dots to indicate wave signal of random direction and wavelength. A detailed illustration about the watermark signal will be discussed hereinafter.

Then, step S103, which is provided to arrange the signal unit of the bit array corresponding to the binary code onto the watermark image.

A detailed illustration about distributing watermark signal to each symbol of the code in the step S102 is now discussed.

Figure 3:
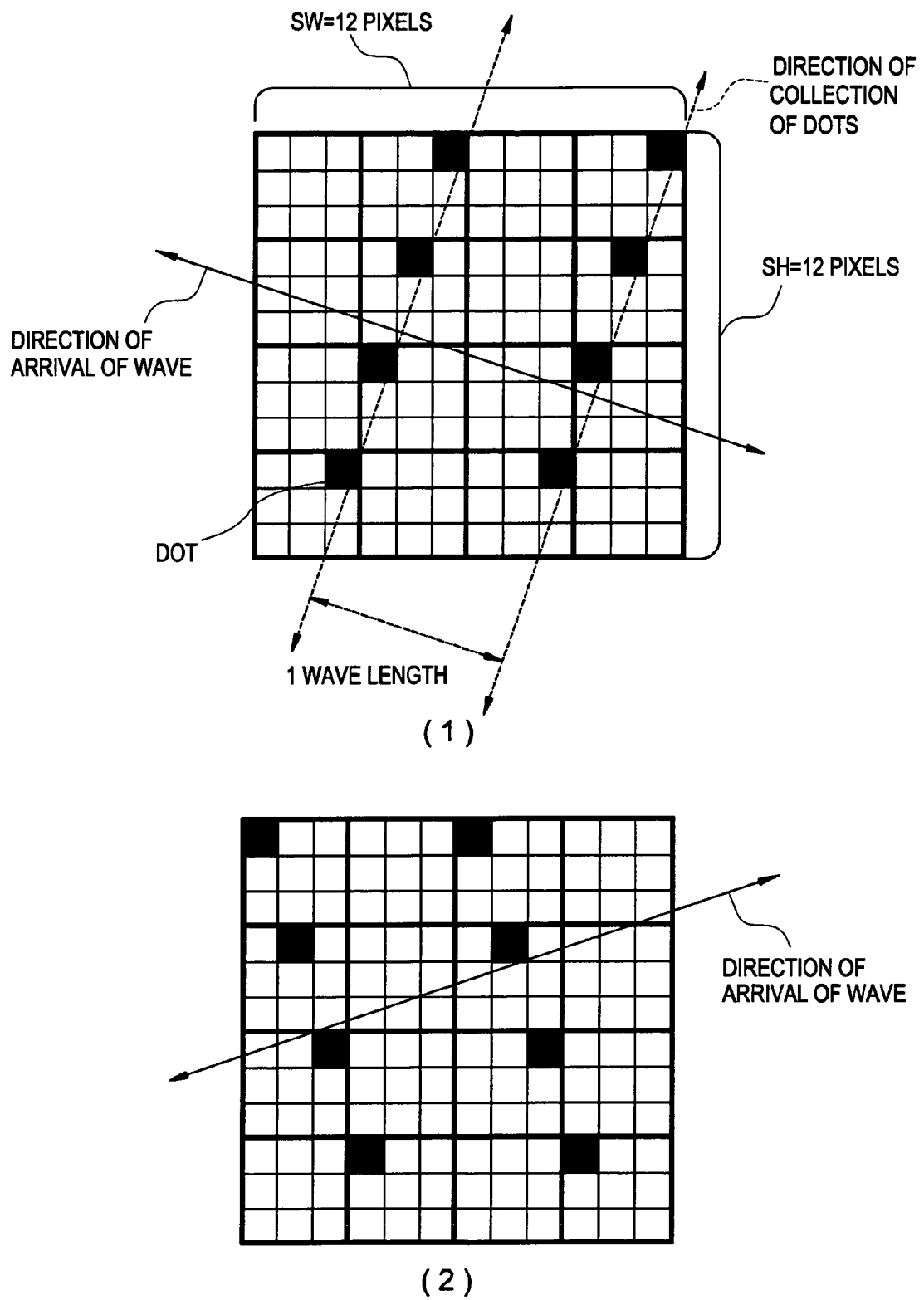
FIG. 3 is an example of a watermark encoding in the first embodiment.

FIG. 3 is a schematic diagram showing an example of the watermark signal.

It is supposed that width and height of watermark signal are Sw and Sh respectively. Sw and Sh can be chosen different values. Here, in order to explain conveniently, it is supposed that Sw=Sh in this embodiment. Referring to FIG. 3, supposed Sw=Sh=12, and the unit of length is numbers of pixel. The size on paper printed from the signal is determined by the resolution of the watermark image. For example, if the watermark image is 600 dpi (dot per inch, unit of resolution, that is dots within one inch), the width and height of the watermark signal in containing watermark document is 12/600=0.02 (inch).

The following is to take a rectangle of which width is Sw and height is Sh as one unit of signal, call as signal unit. In FIG. 3(1), distances between dots are gathered in an arctan (3) (arctan is an inverse function of tan) direction relative to a horizontal axis, the direction of arrival (DOA) of wave is arctan (−⅓). Here, in FIG. 3 (1), the signal unit is called "Unit A". In FIG. 3 (2), distances between dots are gathered in an arctan (−3) direction relative to the horizontal axis, the DOA (direction of arrival) of wave is arctan (⅓), and the signal unit is called "Unit B".

Figure 4:
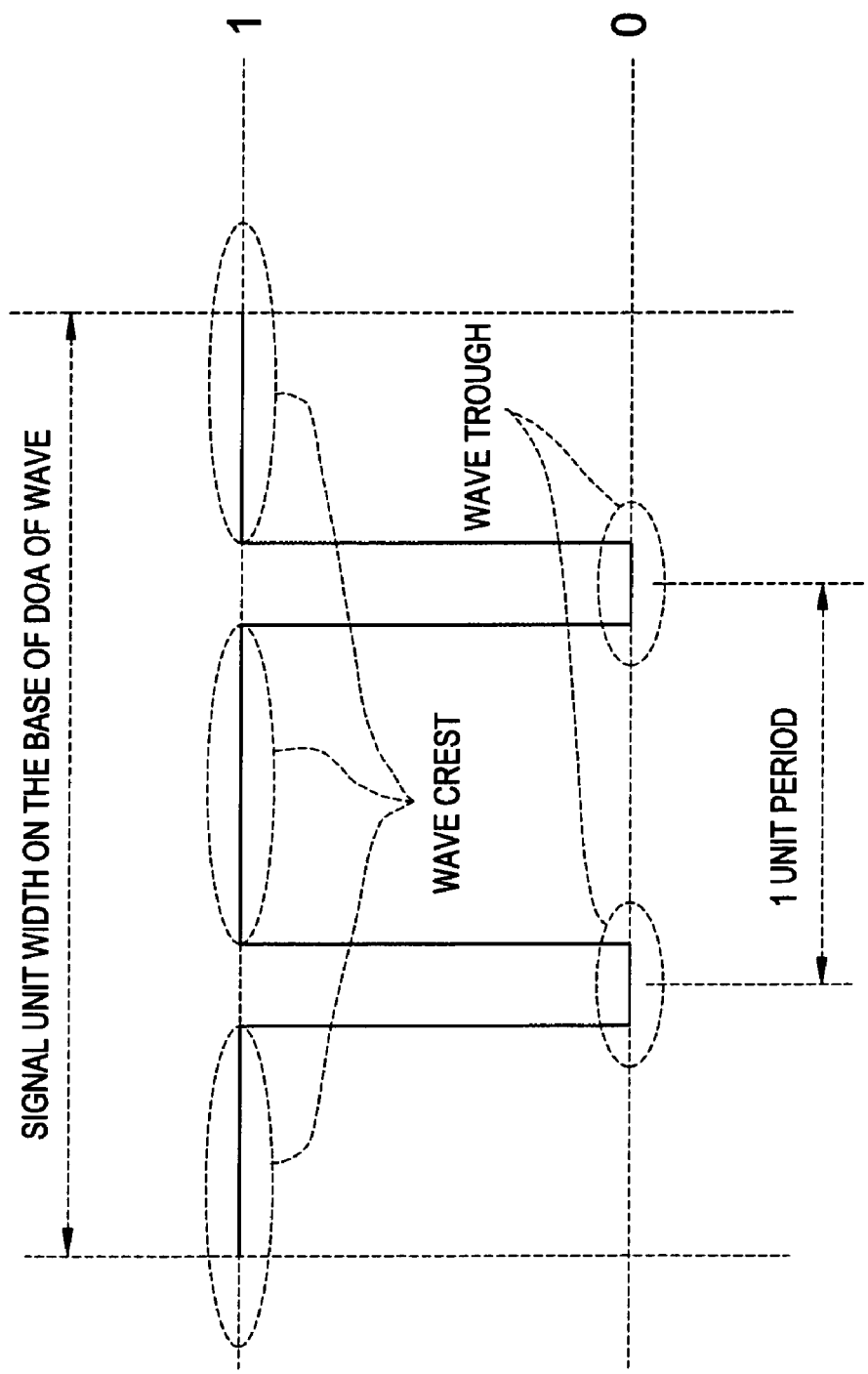
FIG. 4 is a sectional view shown pixel value variability in FIG. 3 taken from $\arctan(1/3)$ direction.

FIG. 4 is a sectional view showing pixel variation of FIG. 3 (1) taken from arctan (⅓) direction.

In FIG. 4, an area where arrays dots is wave trough, and an area where doesn't array dots is wave crest. There are two areas that collected with dots in one unit, and thus, the frequency of one unit in this embodiment is 2. The direction of arrival (DOA) of wave is perpendicular to the direction of collection of dots. The wave of Unit A is in arctan (−⅓) direction relative to the horizontal axis, and the wave of Unit B is in arctan (⅓) direction relative to the horizontal axis. When the arctan (a) direction is perpendicular to the arctan (b) direction, a×b=−1.

In this embodiment, the watermark signal of Unit A is defined as symbol 0, and the watermark signal of Unit B is defined as symbol 1, and call such symbol as symbol unit. During the watermark signals, following dot array can be considered in addition to those shown in FIG. 3 (1), (2).

Figure 5:
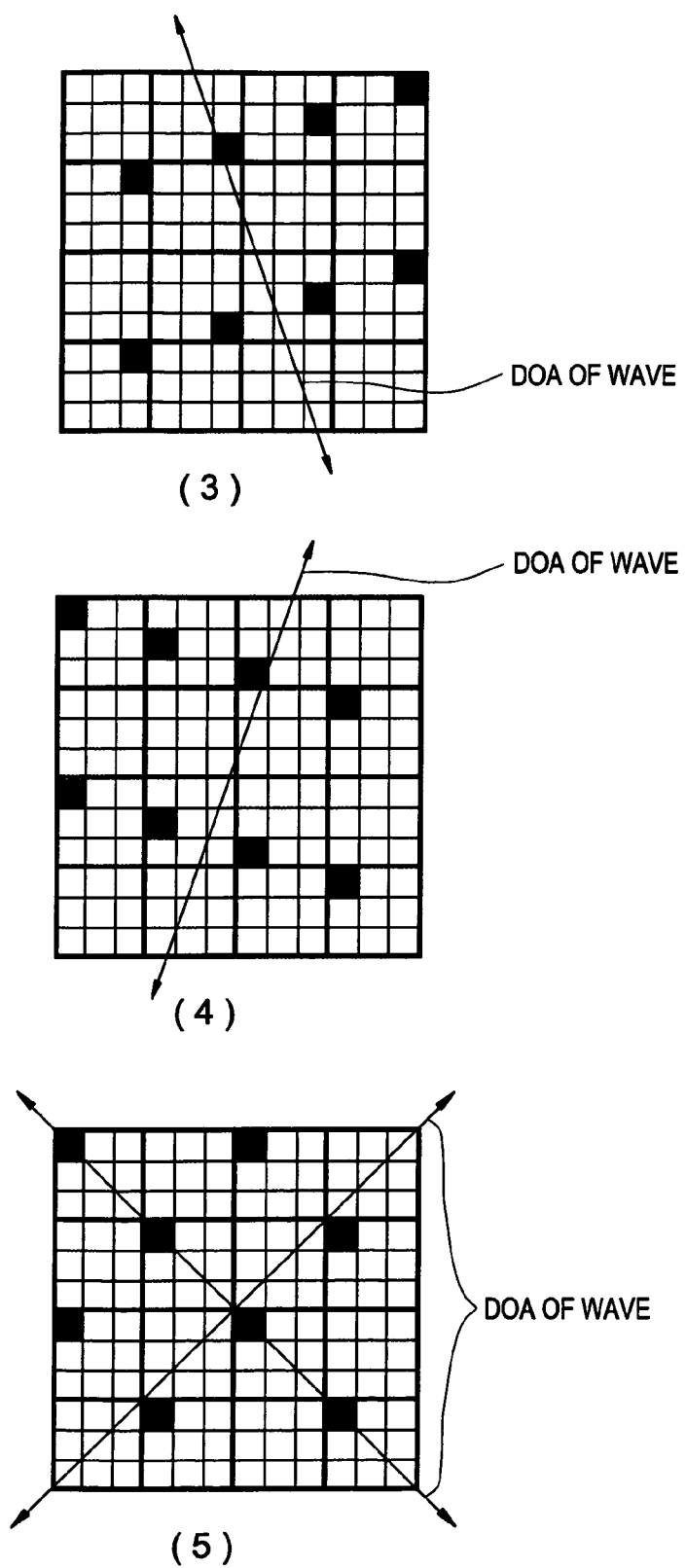
FIG. 5 is an explanation view of other watermark information.

FIG. 5 is an illustration view of other watermark signals.

As shown in FIG. 5 (3), distances between dots are collected in an arctan (⅓) direction relative to the horizontal axis, and the DOA of wave is an arctan (−3) relative to the horizontal axis. Such signal unit is called "unit C".

As shown in FIG. 5 (4), distances between dots are collected in an arctan (−⅓) direction and DOA of the wave is an arctan (3) direction relative to the horizontal axis, respectively. Such signal unit is called "unit D". In FIG. 5 (5), distances between dots are collected in an arctan (1) direction and the DOA of wave is an arctan (−1) direction. There can also be considered that, in FIG. 5 (5), distances between dots are collected in an arctan (−1) direction relative to the horizontal axis, and the DOA of wave is an arctan (1) relative to the horizontal axis. Signal unit in FIG. 5 (5) is called "unit E".

In this way, the combination images of distributed symbol 0 and unit can be plurality in addition to the above mentioned combinations. Therefore, which watermark signal distributed to which symbol is confidential, and other users (unauthority users) are hard to recognize the embedded signal.

Furthermore, in the step S102 shown in FIG. 2, if the watermark information is encoding with 4 metacode, symbol 0 is distributed to Unit A, symbol 1 is distributed to Unit B, symbol 2 is distributed to unit C, and symbol 3 is distributed to unit D.

With reference to the example shown in FIG. 3 and FIG. 5, it is assumed that the numbers of dots within one unit is a constant, and such units are configured without interruption, thereby the shade of the watermark image appearing uniformly. Thus, it seems that a gray image with single density is embedded as a backdrop on the print paper.

For example, in order to obtain the mentioned effect, unit E is defined as backdrop unit (signal unit that isn't distributed symbol), configured without interruption and taken as a backdrop of the watermark image. When symbol unit (Unit A, Unit B) is embedded in the watermark image, the position where the symbol unit (Unit A, Unit B) to be embedded replaces the backdrop unit (unit E).

Figure 6:
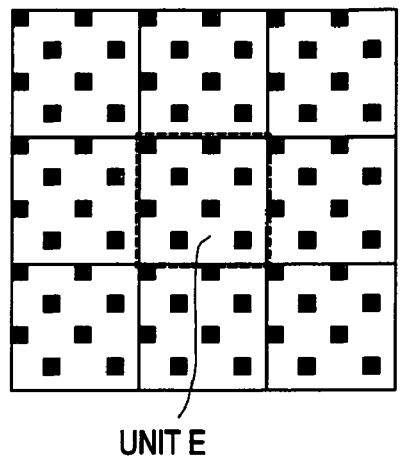
FIG. 6 is a schematic view showing the state of unit configuration.
Figure 6:
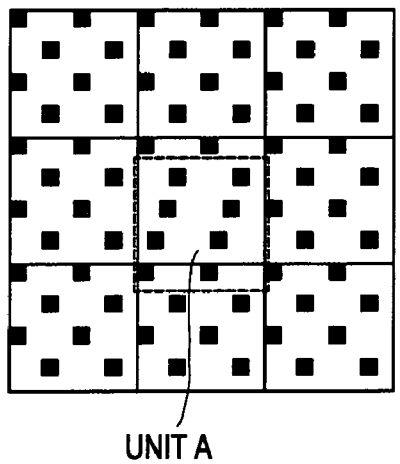
Figure 6:
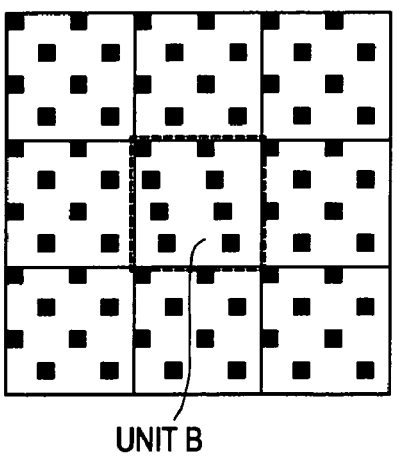

FIG. 6 is a schematic view representation the state of unit configuration. In FIG. 6 (1), unit E is defined as backdrop unit, and configured without interruption to be a backdrop of the watermark image. In FIG. 6 (2) is an example showing that Unit A is embedded in the watermark image in FIG. 6 (1). FIG. 6 (3) is an example showing that Unit B is embedded in the watermark image in FIG. 6 (1). In this embodiment, utilizing backdrop unit as the backdrop of the watermark image is illustrated. The watermark image can also be generated via collocation symbol unit.

Figure 7:
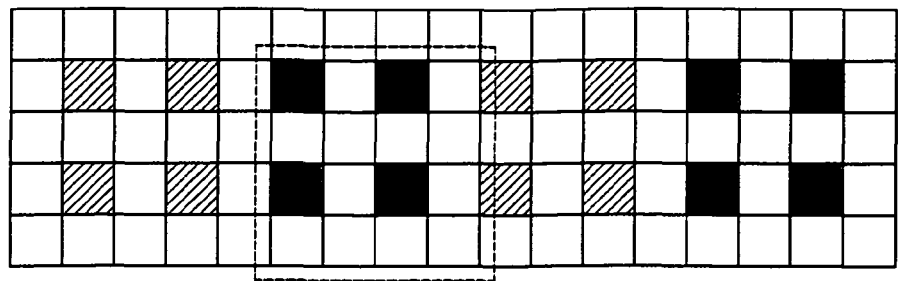
FIG. 7 is a schematic view showing one character of the codes being embedded in the watermark image.
Figure 7:
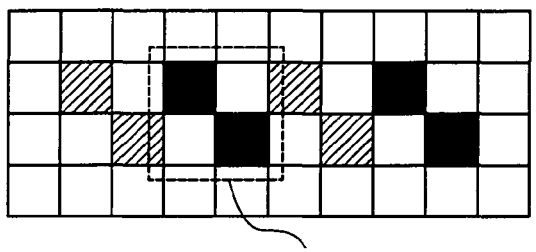
Figure 7:
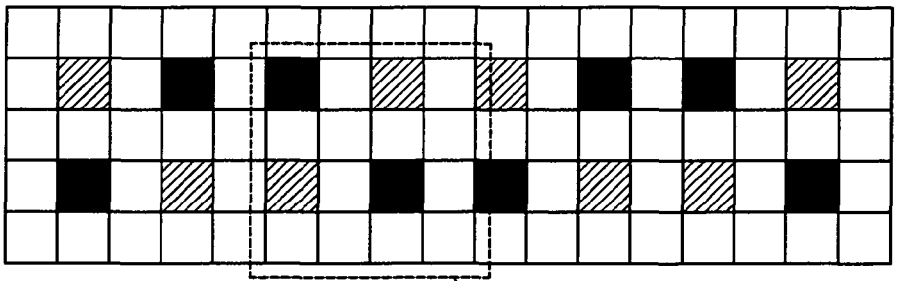
Figure 7:
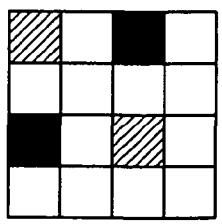
Figure 7:
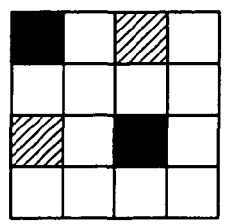

FIG. 7 is a schematic view showing that one symbol of the codes are embedded in the watermark image. FIG. 7 shows an example that "0101" bit array is embedded. As shown in FIG. 7 (1) and FIG. 7 (2), the same symbol unit is embedded repeatedly so as to be detected correctly after words in the document are overlapped the symbol unit. The embedded times of the symbol unit and distribution images (called "unit image") are random.

FIG. 7 (1) is an example of unit image. In FIG. 7 (1), the embedded times is four (there is four symbol units in one unit image). In FIG. 7 (2), the embedded times is two (there is two symbol units in one unit image). The embedded times can also be defined as one (there is one symbol unit in one unit image).

In FIG. 7 (1) and FIG. 7 (2), one character is distributed to one character unit. In FIG. 7 (3), the distribution image of the character unit is provided with character.

How many bits information that can be embedded in the watermark image of one page is determined by the size of the signal unit, size of the unit image and size of the document image. Whether signals have being embedded in the horizontal and vertical directions of the document image can be detected or worked out by counter-operation of the size of inputted image and signal unit.

It is supposed that there are Pw amount of unit images embedded in horizontal direction of the watermark image of the one page, and Ph amount of unit images embedded in vertical direction of the watermark image. Thus, the unit image at random position can be represented as U (x, y), which is called "unit image array", and wherein x=1~Pw, and y=1~Ph. The bits of information that can be embedded within one page is equal to Pw×Ph, and is named as embedded bit amount.

Figure 8:
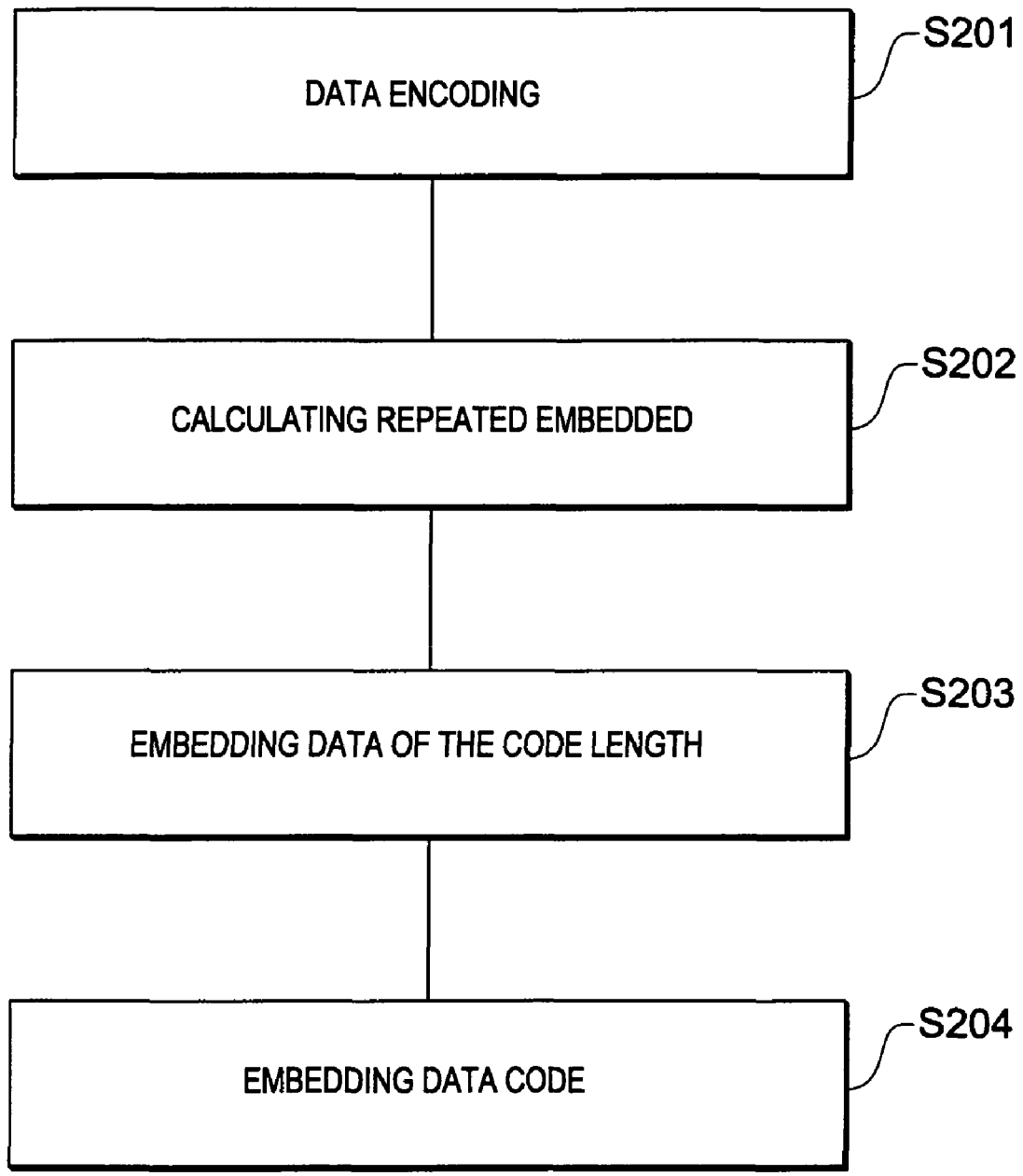
FIG. 8 is a flow chart showing the watermark information embedded in the watermark image.

FIG. 8 is a flow chart showing the watermark information embedded in the watermark image. An illustration about repeatedly embedding the same information in the watermark image of one sheet (one page quotient) is given. Even a whole unit image is wiped away and the embedded watermark information therein is lost, the embedded watermark information can still be read out because of the same information is repeatedly embedded and overlapping the document image.

Step S201: transforming the watermark information 106 into N metacode. Processes in this step are similar to the step S101 in FIG. 2. Here, data to be encoded is named as data code, data code represented as combination of unit image is called "data code unit' Du.

Step S202: working out repeated embedded times that the data code unit of one page image can be embedded according to the code length (bit amount) of the data code and embedded bit amount. Data of the code length of the data code are embedded in the first line of the unit image array except for the outline of the watermark image area. The code length of the data code can be also defined as a constant, and the data of the code length don't be embedded in the watermark image.

The data code length is denoted with Cn, and the embedded times Dn of the data code unit can be worked out as following formula:

$$Dn = \left[\frac{Pw \times (Ph - 1)}{Cn}\right]$$ [Formula 1]

It is supposed that (A) is represented as the maximal integer which is not more than A.

If the remainder is represented as Rn (Rn=Cn−(Pw×(Ph−1))), the remainder Rn is equal to the data code unit, which is generating after embedding for Dn times in unit image array, and the unit image of Rn bit shares before the data code. However, the remainder Rn bit shares are not always embedded in.

Figure 9:
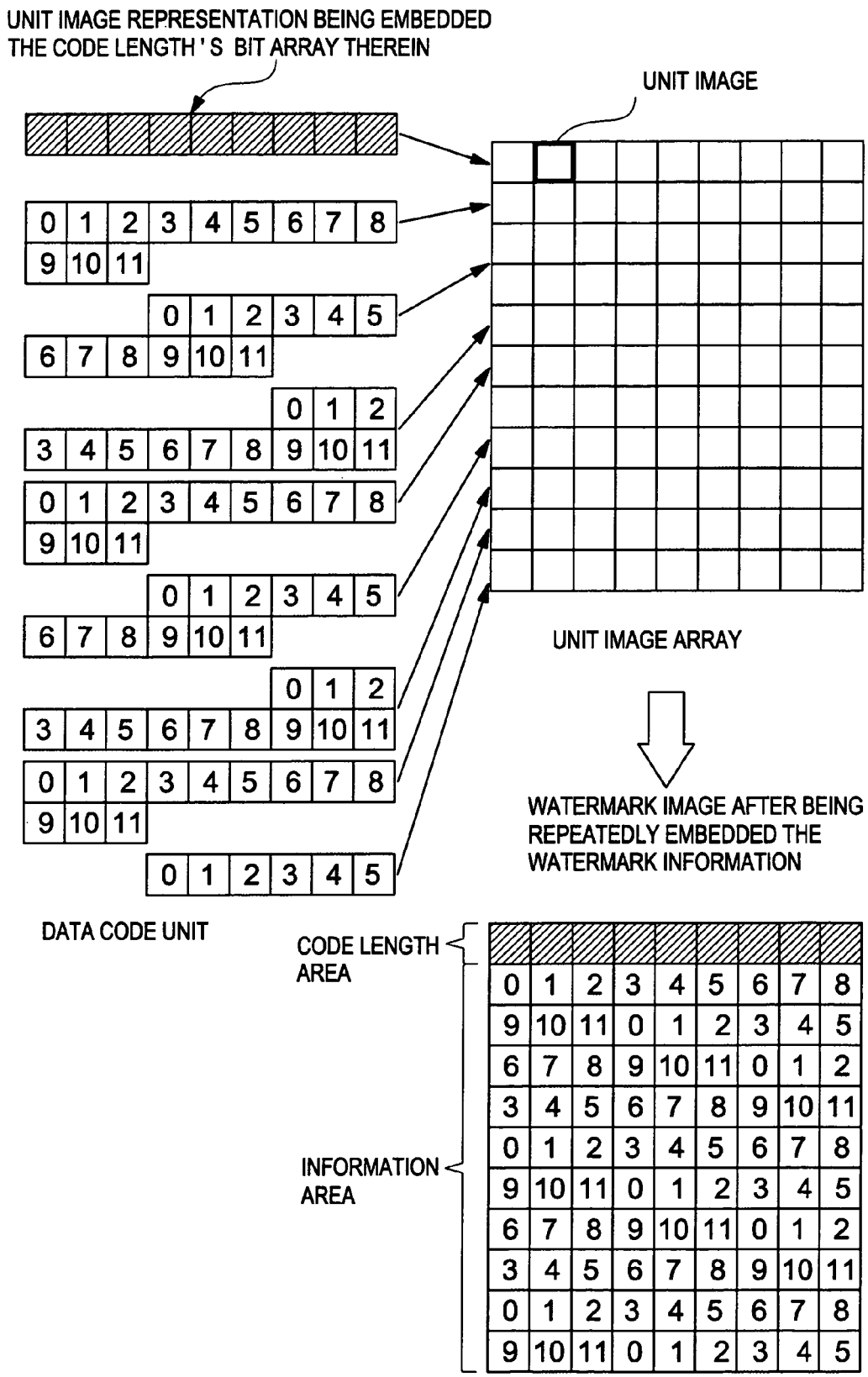
FIG. 9 is a schematic view showing embedding process of the watermark information.

FIG. 9 is an example showing embedding process of the watermark information. As shown in FIG. 9, the size of the unit image array is 9×11 (11 rows, 9 columns), the data code length is 12 (the code characters of the data codes are denoted with 0~11 in FIG. 9).

Step S203: embedding data of code length in the first row of the unit image array. In FIG. 9, the diagram showing an example that the code length is 9 bits, and the watermark information is embedded only once. However, similar to the data code, the data of the code length can be embedded repeatedly as long as the width Pw of the unit image array is large enough.

Step S204: repeatedly embedding the data code unit in since the second row of the unit image array. As shown in FIG. 9, the data code unit is embedded in turn along a row direction from a MSB (most significant bit) or LSB (least significant bit) of the data code. FIG. 9 shows an example that the data code unit is embedded for seven times and six bits data before the data code are embedded.

As shown in FIG. 9, data can be embedded along the row continuously, and can also be embedded along the column continuously.

An illustration about embedded outline in this embodiment is given.

The watermark generator 102 generates a containing watermark document image just like FIG. 9. The unit images representation 1 are configured contiguously around the watermark information area.

Figure 10:
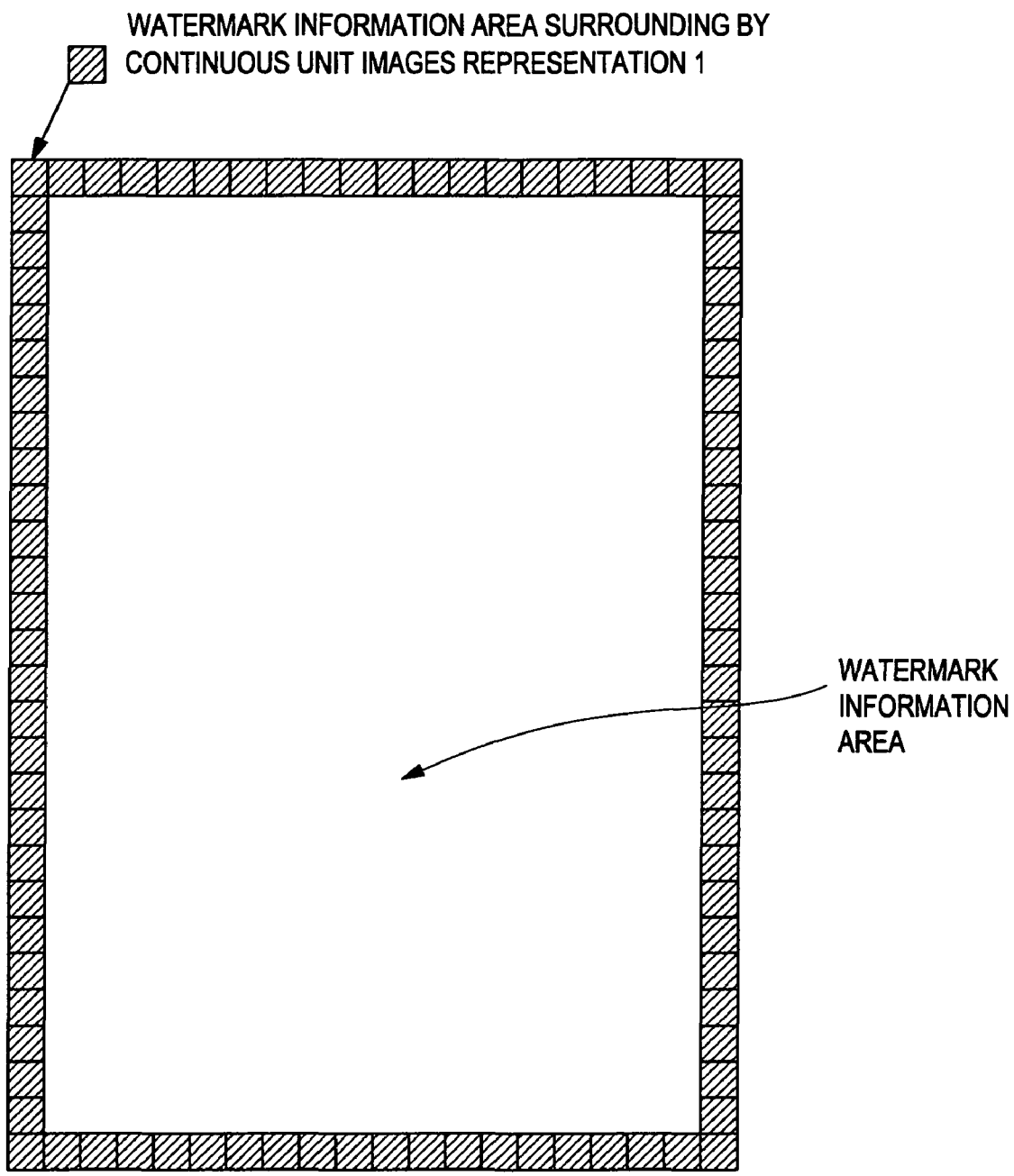
FIG. 10 shows unit images surrounding a outline of the watermark information area.

FIG. 10 shows unit images surrounding a outline of the watermark information area. As shown in FIG. 10, the unit images representation 1 are configured contiguously around the watermark information area, while image in the watermark information area is omitted.

The above description is about how the watermark image generator 102 generates the watermark image. And now to explain the containing watermark document image synthesizer 103.

The containing watermark document synthesizer 103 is provided to make the document image generated by the document image generator 101 and the watermark image generated by the watermark generator 102 overlap each other. Each pixel value of the containing watermark document image is worked out via ANDing with pixels of the document image and watermark image. That is to say, as long as one pixel value of the document image and the watermark image is 0 (black), the pixel value of the containing watermark document image is 0 (black), while others are 1 (white).

Figure 11:
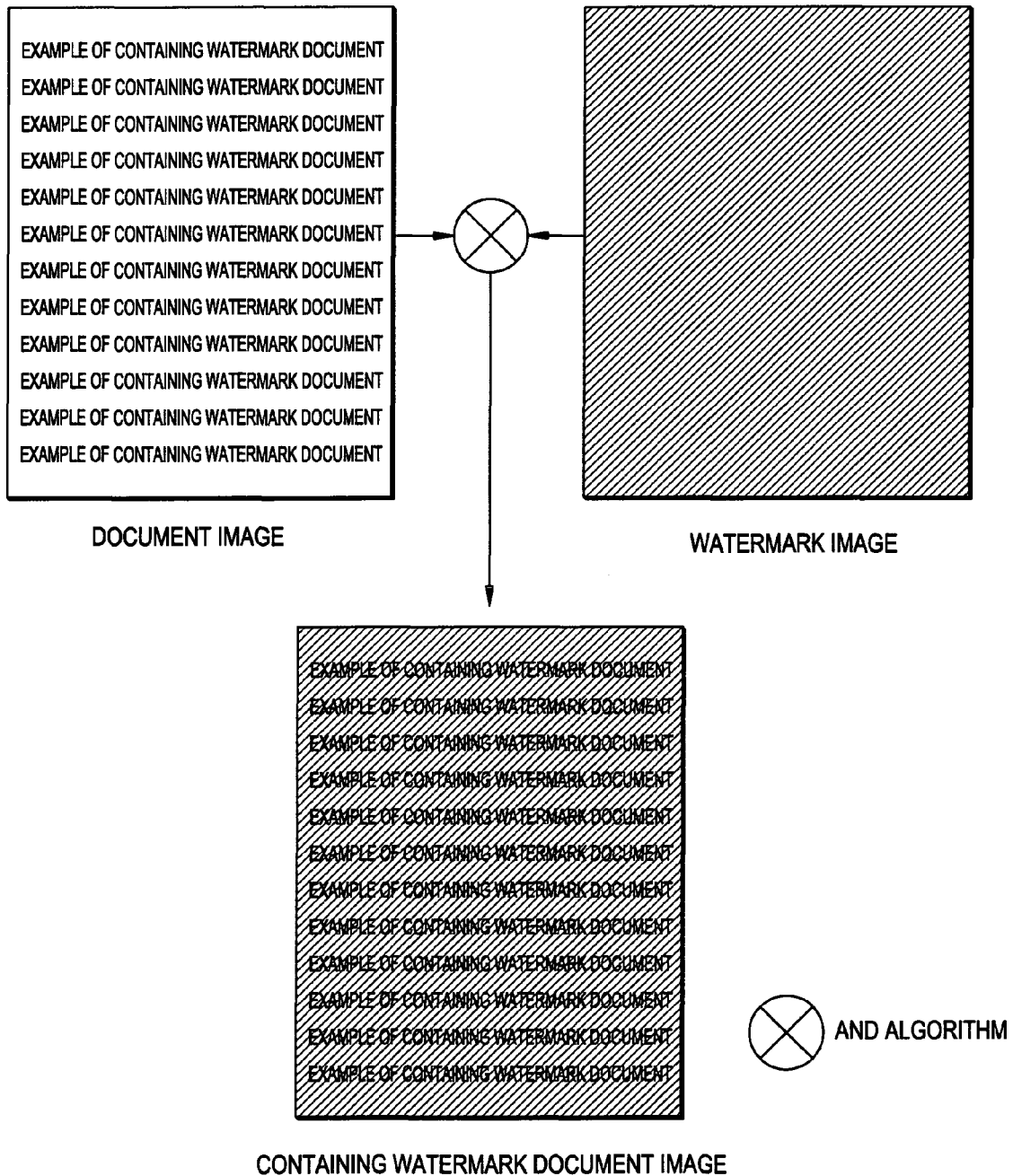
FIG. 11 is an example of the containing watermark document image.

FIG. 11 is an example of the containing watermark document image.

Figure 12:
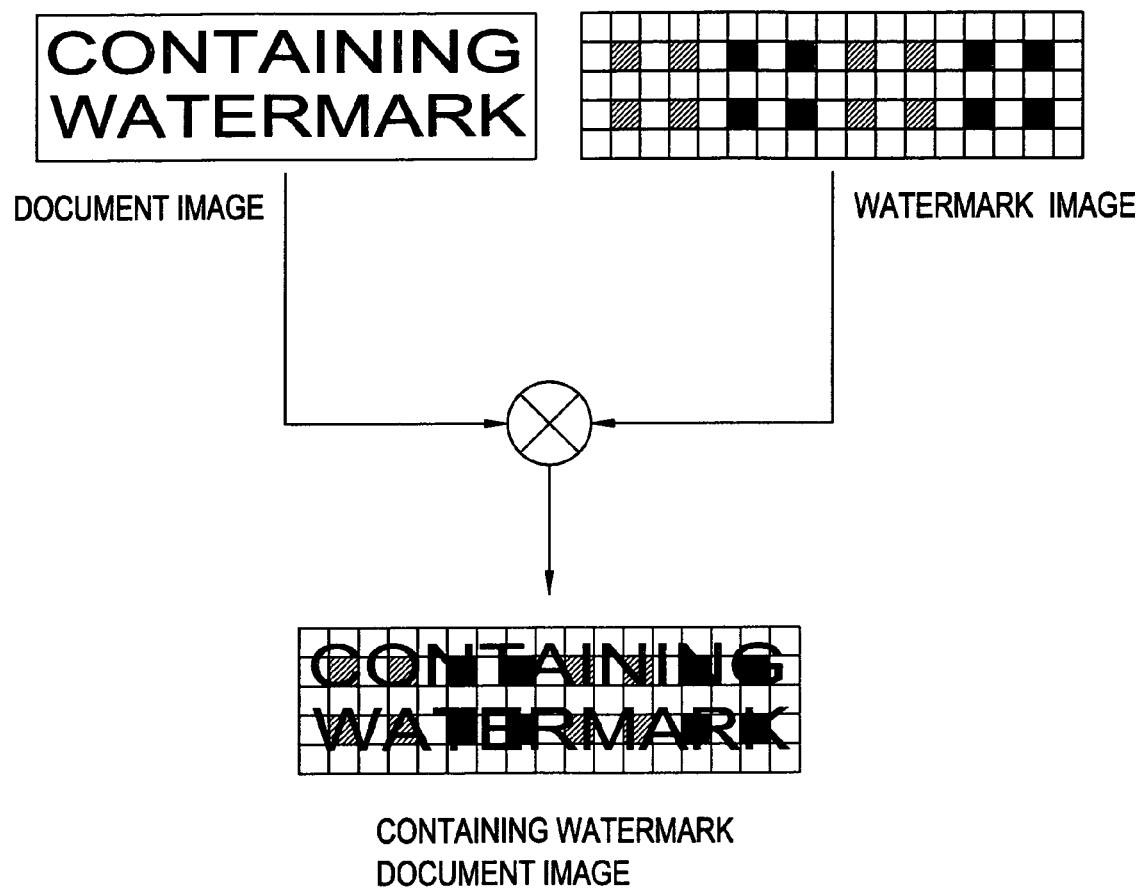
FIG. 12 is an enlarged view of FIG. 11.

FIG. 12 is an enlarged view of FIG. 11.

In FIG. 12, the unit image is adopted the image shown in FIG. 7 (1). The containing watermark document image is outputted by the output device 104.

The above illustration is about the watermark information embedding apparatus 100. Now description about the watermark information detecting apparatus 300 is discussed with reference to FIG. 1 and FIGS. 13-21.

Figure 13:
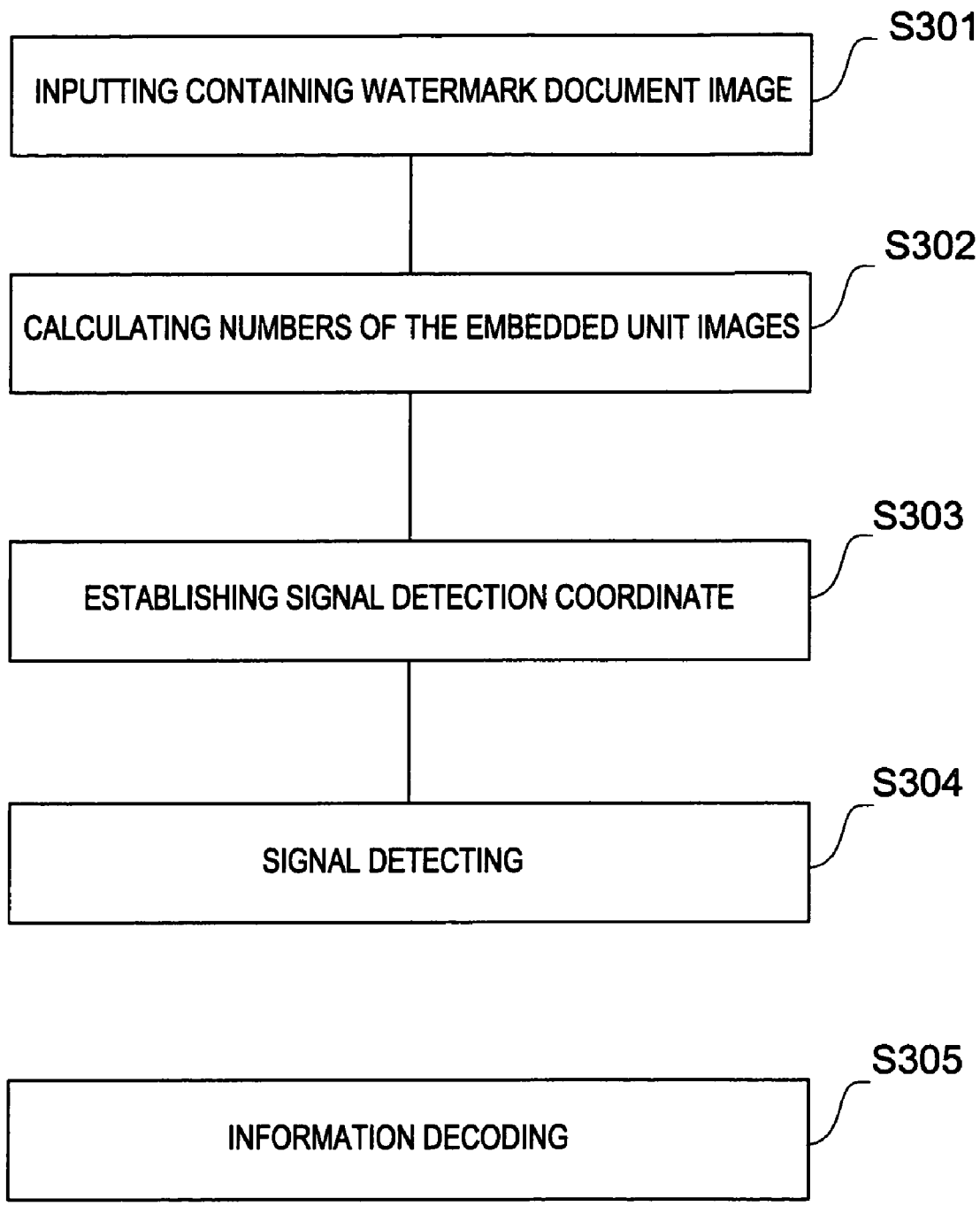
FIG. 13 is a flow chart showing steps of a watermark detector.

FIG. 13 is a flow chart showing steps of the watermark detector 302.

Step S301: inputting the containing watermark document image to the storage of a computer through the input device 301 such as a scanner. Such image is called "input image". The input image can be a multi bitmap image. The following explanation is about the gray image of 256 gray grade. The resolution of the input image (reading resolution of the input device 301) can also be different from that of the containing watermark document image generated by the watermark information embedding apparatus 100. In this embodiment the resolution of the input image is equal to that of the containing watermark document image. It is supposed that the input image is revised by several processes such as rotation, flexing and so on.

Step S302: working out numbers of the embedded unit images according to the size of the signal unit and the input image. For example, it is supposed that the size of input image is W (width)×H (height), the size of the signal unit is Sw×Sh, and the numbers of the unit image are Uw×Uh, then the numbers of the embedded unit image in the input image are N=Pw×Ph, which can be worked out as following formula:

$$Pw = \frac{W}{Sw \times Uw}, \quad Ph = \frac{H}{Sh \times Uh}$$ [Formula 2]

If the resolution of the watermark information embedding apparatus 100 is different from that of the watermark information detecting apparatus 300, the numbers N of the embedded unit images can also be calculated according to the Formula 2 after normalize the signal unit of the input image according to the resolution ratio of the watermark information embedding apparatus 100 and the watermark information detecting apparatus 300.

Step S303: compartmentalizing the input image according to the numbers of the unit images generated from the step S302.

Figure 14:
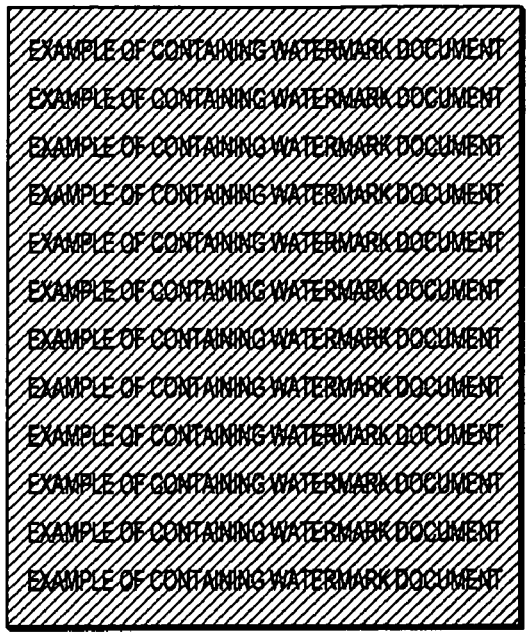
FIG. 14 is an example of an input image being compartmentalized into unit images.
Figure 14:
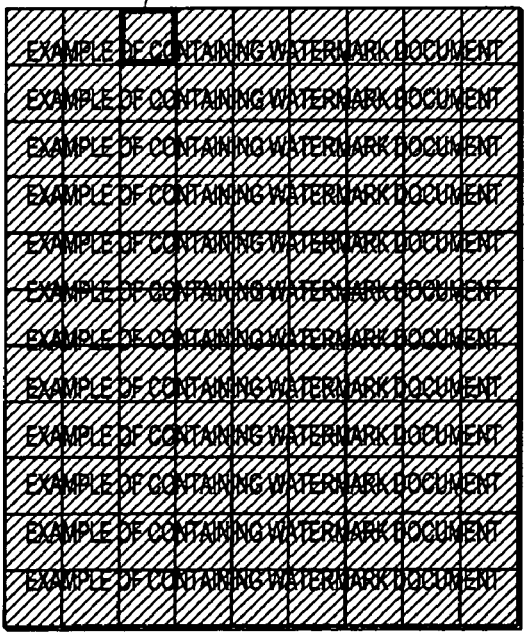

FIG. 14 shows an example of an input image (FIG. 14 (1)) and an example of the input image after being compartmentalized into unit images (FIG. 14 (2)).

Step S304: detecting character unit of the compartment of each unit image, reconverting the unit image array. A detailed illustration about the signal detecting is discussed as follows.

Figure 15:
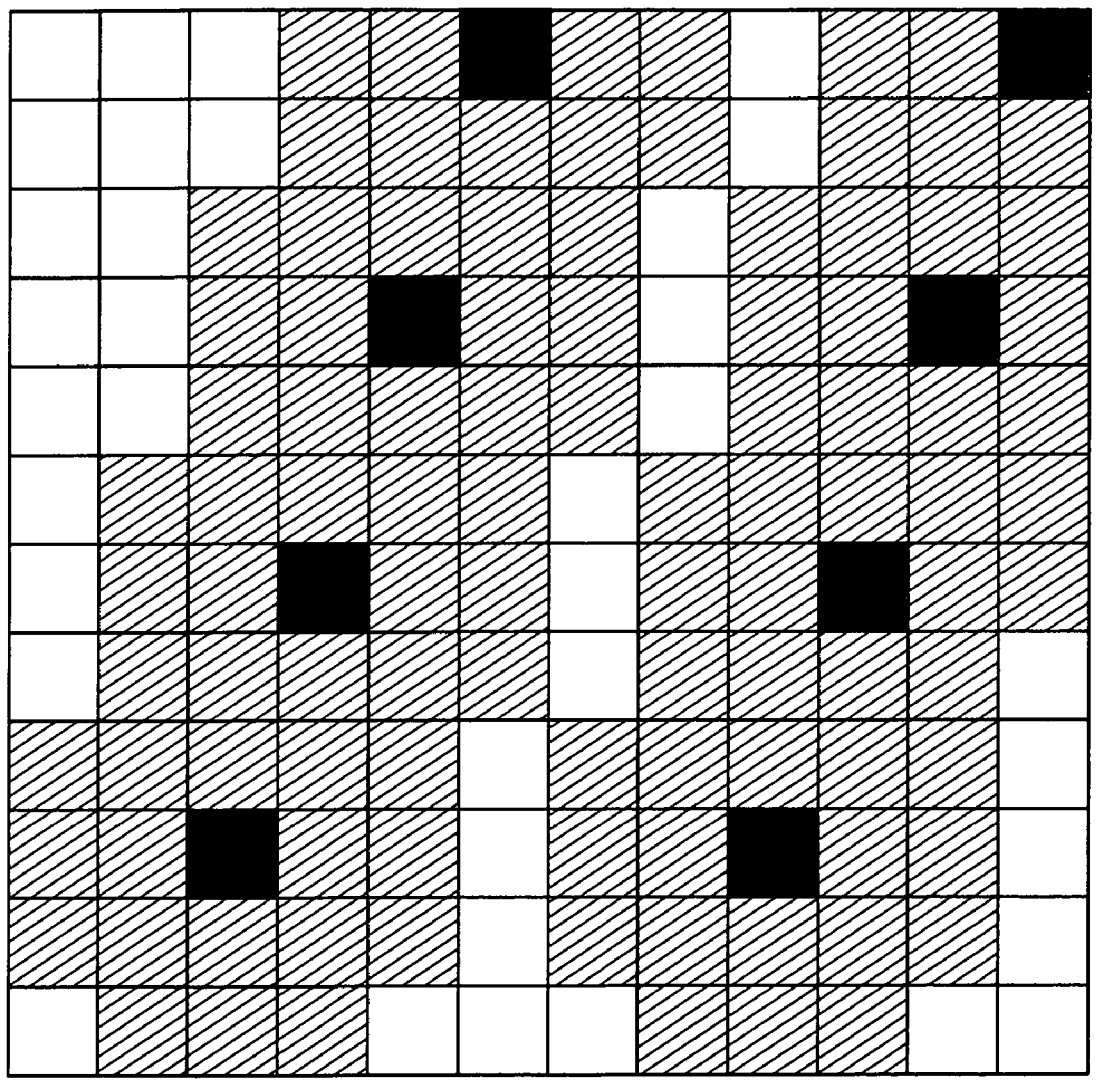
FIG. 15 is an example showing Unit A in FIG. 3 (1) of the input image.

FIG. 15 is an example showing Unit A in FIG. 3 (1) of the input image.

The signal unit in FIG. 3 is a two bitmap image, while in FIG. 15 is a multi bitmap image. As shown in FIG. 15, when printing a two bitmap image, the shade of the image is varied continuously because of ink infiltration or other factors thereby rendering demitint between white and black distributing around the dots.

Figure 16:
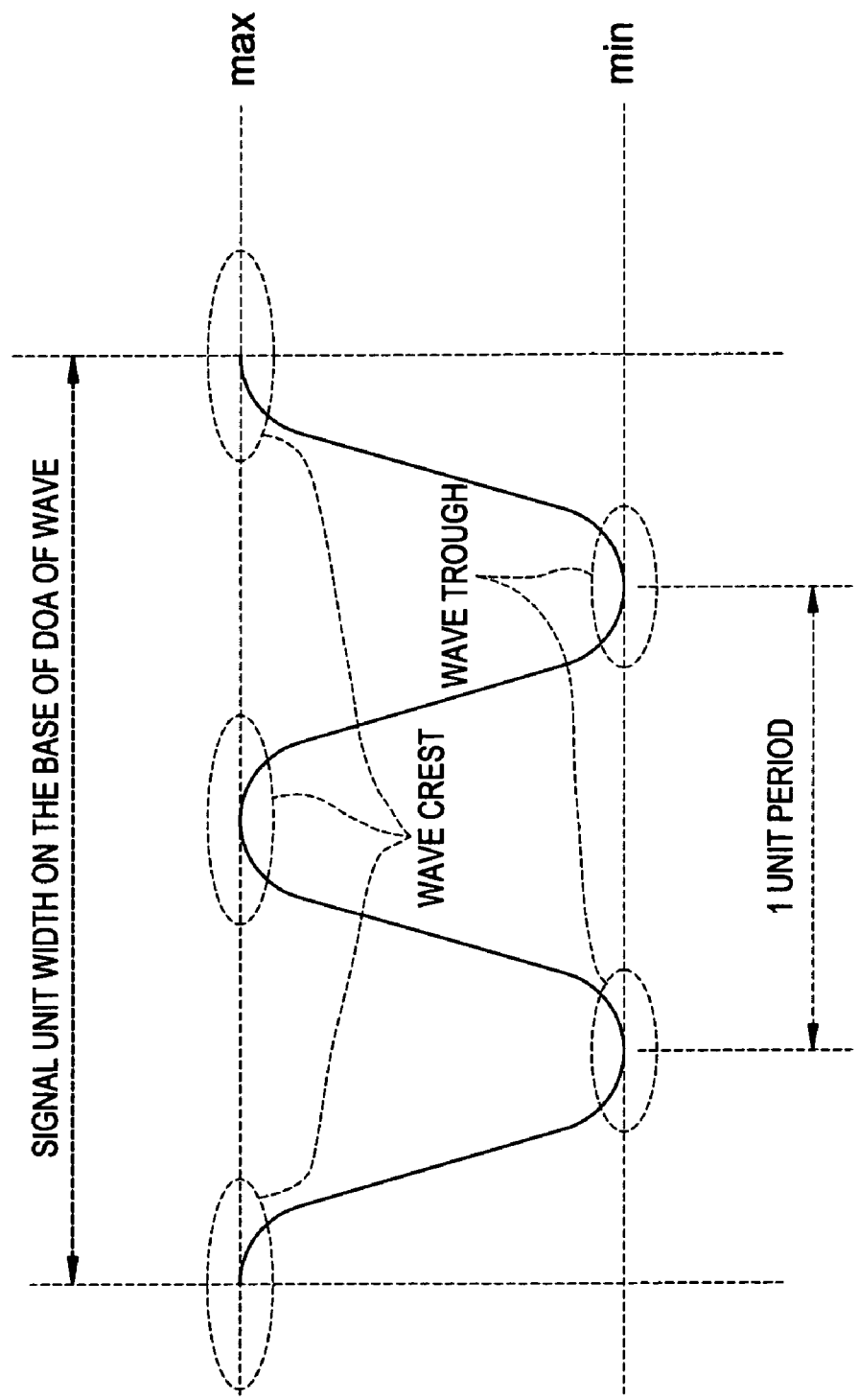
FIG. 16 is a sectional view of FIG. 15 taken from a direction parallel to the DOA (direction of arrival) of the wave.

FIG. 16 is a sectional view of FIG. 15 taken from a direction parallel to the DOA (direction of arrival) of the wave.

With reference to drawings, the wave in FIG. 4 is a rectangular wave, while in FIG. 16 is a circular wave.

The input image is affixed with kinds of interference noises with respect to partial variety of the thickness of the paper, spots of the print document, instability of the output device or the image input device, etc. The description discussed here is in condition that there is no any interference noise in the input image. However, steady signal can also be detected from the input image with interference noises using methods in this invention.

In order to detect the signal unit from the input image, a two-dimensional wavelet filter which can define frequency, direction and swing of the wave simultaneously is used. Gabor filer is an example of the two-dimensional wavelet filter. Filters are of same function of the Gabor filter can also be used. A method that defining a pattern having the same dot pattern with the signal unit and performing pattern matching can also be used.

Following parameters such as G (x, y), x=0~gw−1 and y=0~gh−1 are used to represent the Gabor filter. Wherein the size of the filter is denoted with gw and gh, which is equal to that of the embedded signal unit of the watermark information embedding apparatus 100.

$$G(x, y) = \exp\left[-\pi\left\{\frac{(x-x0)^2}{A^2} + \frac{(y-y0)^2}{B^2}\right\}\right] \times \exp[-2\pi i\{u(x-x0) + v(y-y0)\}]$$ [Formula 3]

wherein: I is an imaginary number unit;

$x=0{\sim}gw-1, y=0{\sim}gh-1, x0=gw/2, y0=gh/2;$

A: swaying scope in the horizontal direction;
B: swaying scope in the vertical direction;
$\tan^{-1}(u/v)$: direction of arrival (DOA) of the wave;
$\sqrt{u^2+v^2}$: frequency.

In the signal detecting process, same kinds and numbers of Gabor filters corresponding to the signal units to be embedded are provided. The Gabor filters have the same wave's frequency, DOA and size as those of the character unit to be embedded in the watermark image. The Gabor filters are called Filter A and Filter B respectively with respect to Unit A and Unit B in FIG. 3

The output value of the random position in the input image outputted from the filter is worked out according the convolution of the filter and the image. The Gabor filter includes a real number filter and an imaginary number filter. The real number filter and the imaginary number filer have a half-wavelength phase error therebetween. The square root of the real number and the imaginary number is an output value of the Gabor filter.

For example, the convolution of the real number filter of the Filter A and the input image is denoted with Rc, the convolution of the imaginary umber filter of the Filter A and the input image is denoted with Ic, and the output value F (A) can be represented as following Formula 4.

$$F(A)=\sqrt{Rc^2+Ic^2}$$ [Formula 4]

Figure 17:
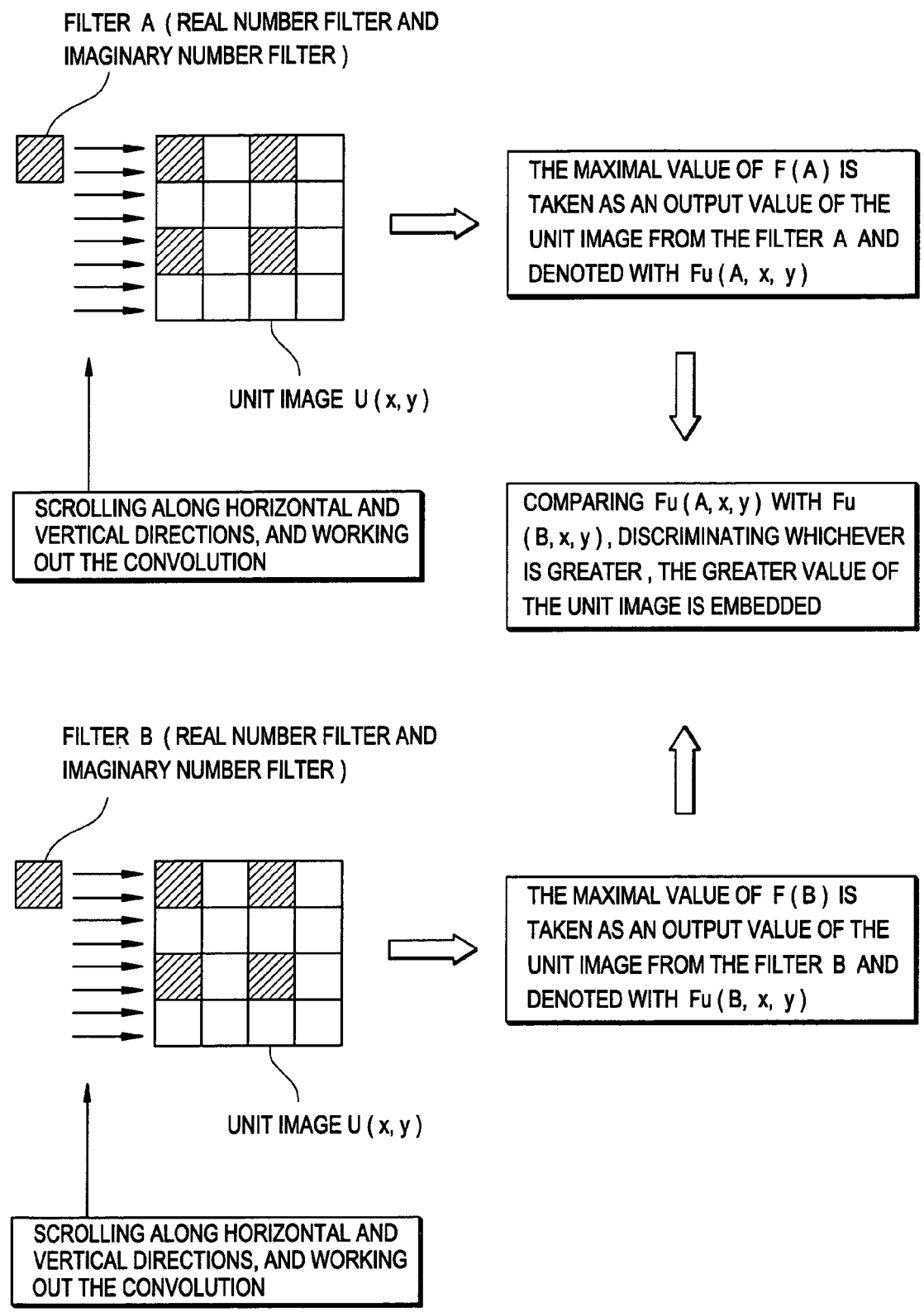
FIG. 17 is a schematic view showing discriminating process of the symbol unit.

FIG. 17 is a schematic view showing process to discriminate whether the character unit of the embedded unit image U (x, y) compartmentalized from the step S303 is Unit A or Unit B A detailed explanation about the discrimination of the unit image U (x, y) is discussed as following steps:

(1) scrolling the Filter A, and counting F (A) according to the unit image U (x, y) at the same time, so as to obtain a maximal value. The maximal value of F (A) is taken as an output value of the unit image U (x, y) from the Filter A and denoted with Fu (A, x, y).

(2) similar to the step (1), working out an output value of the unit image U (x, y) from the Filter B, and recording the output value as Fu (B, x, y)

(3) Comparing Fu (A, x, y) with Fu (A, x, y), if Fu (A, x, y)≧Fu (B, x, y), discriminating the character unit of the embedded unit image U (x, y) as Unit A, while if Fu (A, x, y)<Fu (B, x, y), discriminating the character unit of the embedded unit image U (x, y) as Unit B.

In the step (1) and step (2), scrolling scope of the filter can be adjusted optionally, only representational position's output values of the unit image need to be working out. In the step (3), if the absolute value of the difference between Fu(A,x,y) and Fu(B,x,y) is less than the predetermined threshold, the discrimination can't be done.

In the step (1), during scrolling the filer and counting convolution, once the maximal value of F (A) is more than the predetermined threshold, the character unit of the embedded unit image U (x, y) is regarded as Unit A, and the discrimination process is over. Similarly in the step (2), once the maximal value of F (B) is more than the predetermined threshold, the character unit of the embedded unit image U (x, y) is regarded as Unit B.

The above explanation is about the signal detecting (Step S304). Here is a discussion about step S305 in FIG. 13. The step S305 is to collect the character of the unit image array, generate the data code again, and reconvert the original information.

Figure 18:
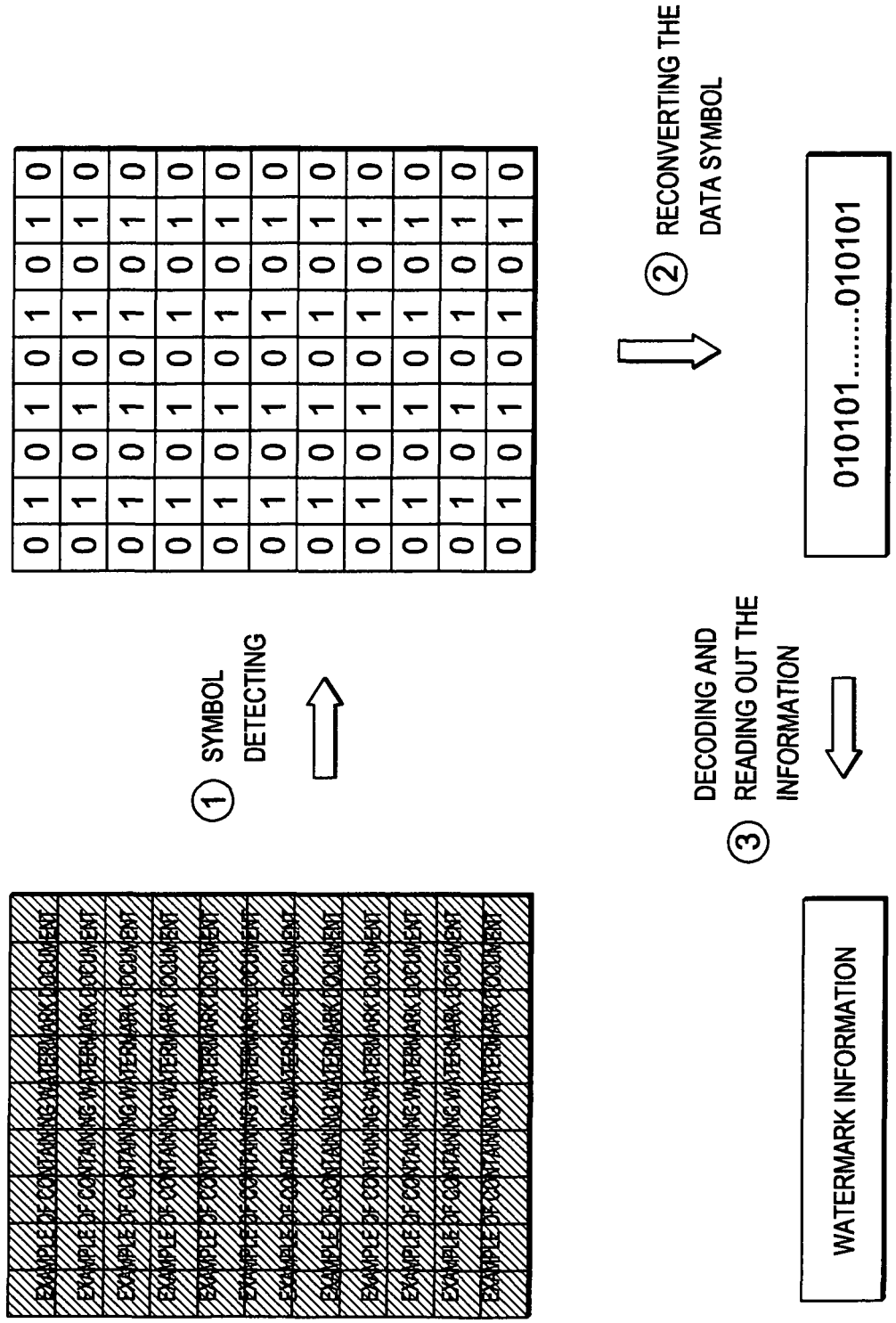
FIG. 18 is schematic view showing an example of reconverting process of the information.

FIG. 18 is schematic view showing an example of reconverting process of the information.

The steps of reconverting process of the information are as follows:

(1) detecting the symbol of each embedded unit image (FIG. 18①);
(2) collecting the symbols, reconverting the data code (FIG. 18②)'
(3) reading out the embedded information after reconverting the data code (FIG. 18③).

Figure 19:
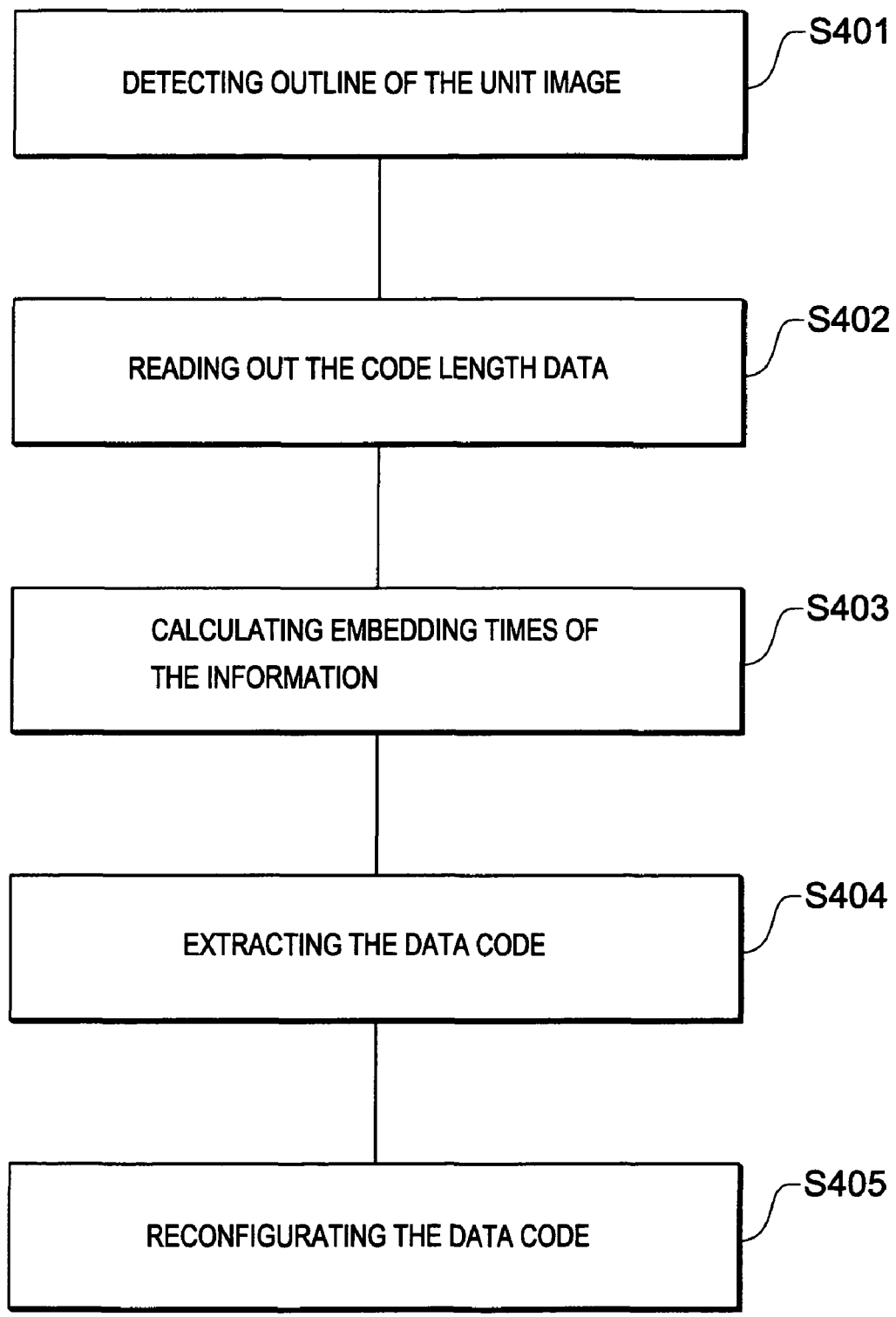
FIG. 19 is a flow chart of reconverting process of the data code.
Figure 20:
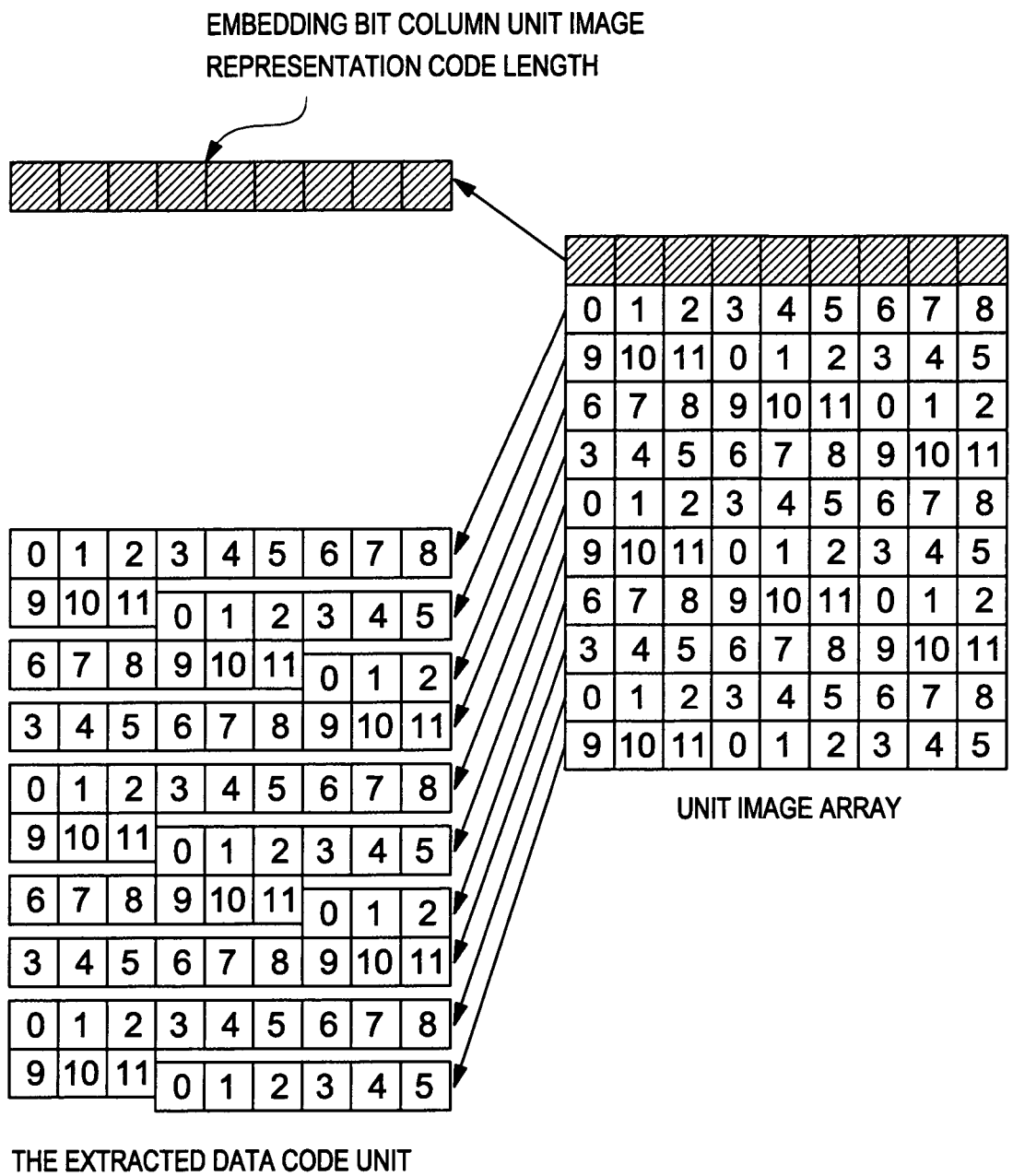
FIG. 20 is a schematic view showing the reconverting process of the data code.
Figure 21:
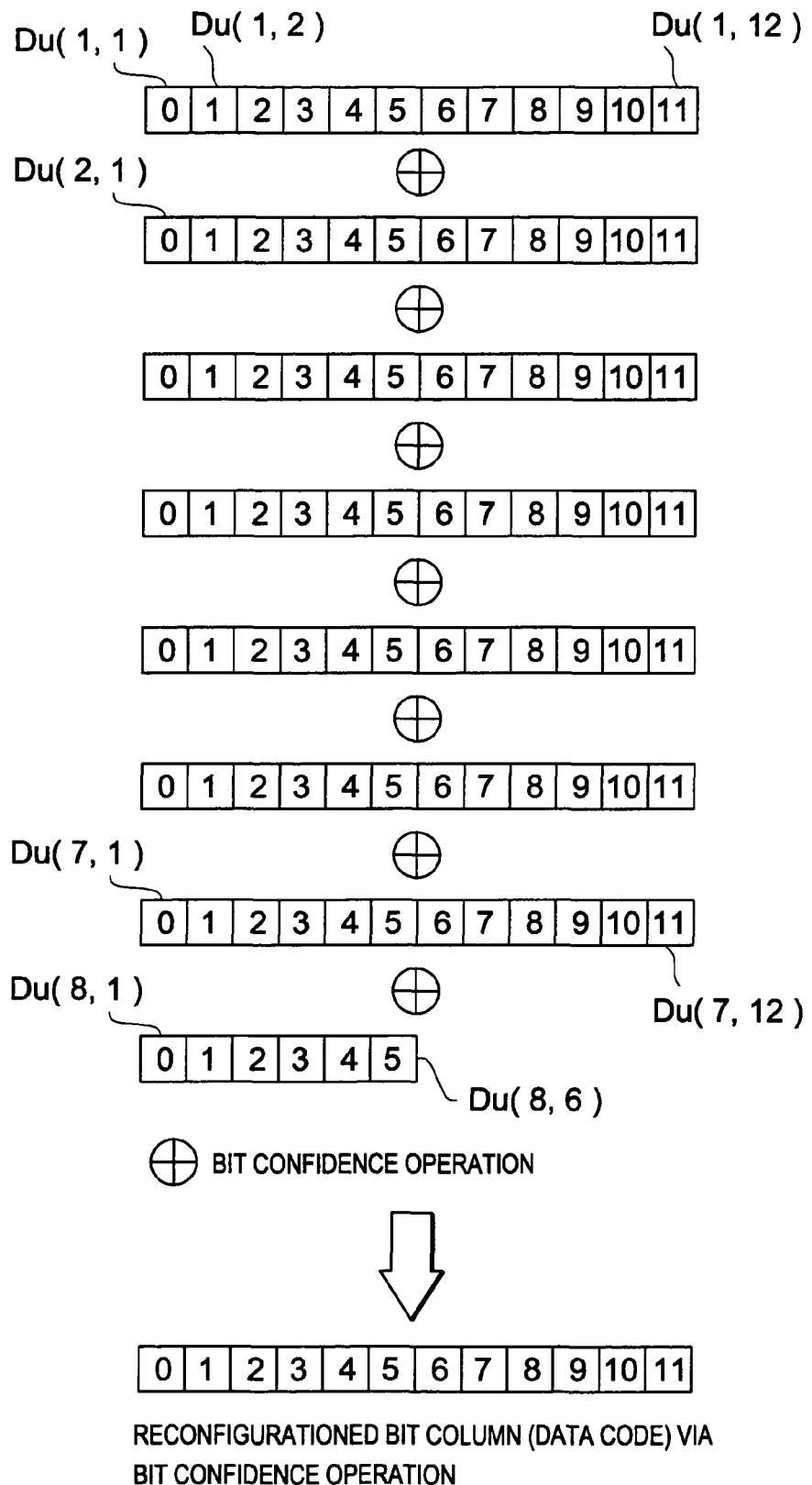
FIG. 21 is a schematic view showing bit confidence operation.

FIGS. 19~21 shows an example of method for reconverting the data code. The reconverting method is substantially a counter-operation of FIG. 8.

FIG. 19 is a flow chart of reconverting process of the data code.

FIG. 20 is a schematic view showing the reconverting process of the data code.

Step S401: detecting outline of the unit image array. This step is to detect the unit image, which is represent "1", configured around the watermark information area in FIG. 10. That is to say, this step is to detect the continuous images representation "1" in row direction and column direction of the unit image array. If such continuous images are detected, the region within such continuous images is regarded as the watermark information area. The following process is to exclude unit images around the outline from the detecting object.

Step S402: reading out the code length data of the first row of the unit image array, getting the code length of the embedded data code.

Step S403: working out embedding times Dn of the data code unit and the remainder Rn according to the size of the unit image array and the code length of the data code generated from the step S402.

Step S404: extracting the data code unit in an inverse method to that of the step S203 from the second row of the unit image array. As showing in FIG. 20, disassembling twelve unit images from U (1, 2) (two rows, one column) one by one (U 1, 2)~U (3, 3), U (4, 3)~U (6, 4), . . . ). In view of Dn=7 and Rn=6, the twelve unit images (data code unit) will be extracted for seven times, and six image units (U (4, 11)~U (9, 11)) (substantially equal to six image unit of the data code units) will be extracted as a remainder.

Step S405: doing bit confidence operation on the data code unit outputted from the step S404 and generating the embedded data unit again. Following is a detailed illustration about the bit confidence operation.

FIG. 21 is schematic view showing bit confidence operation.

As shown in FIG. 21, the data code unit out of the second row and first column of the unit image array is defined as Du (1, 1)~Du (12, 1), the rest may be deduced by analogy and defined as Du (1, 2)~Du (12, 2), . . . . The remainder is defined as Du (1, 8)~Du (6, 8). Bit confidence operation is to check factors of each data code unit according to majority discrimination method so as to obtain symbol value of each data code. Even if signal of the random unit isn't correctly detected from the random data code unit due to words' overlapping and spots on the paper (bit rotation errors, etc.), the data codes can also be ultimately reverted correctly.

For example, the first bit of the data code is determined as "1" in the case of the majority detecting result of the Du (1, 1), Du (12), . . . , Du (1, 8) is "1", while the first data code is determined as "0" in condition that the majority detecting result of the Du (1, 1), Du (12), . . . , Du (1, 8) is "0". Similarly, the second bit data code is determined according to the majority detecting result of Du (2, 1), Du (2, 2), . . . , Du (2, 8), and the twelfth bit data code is determined according to the majority detecting result of Du (12, 1),Du(12, 2), . . . , Du(12, 7) (until Du(12, 7) because of inexistence of Du (12, 8)).

The bit confidence operation can be carried out through adding the output value of the signal detecting filter in FIG. 17. For example, symbol "|0" is distributed to Unit A in FIG. 3 (1), symbol "1" is distributed to Unit B in FIG. 3 (2), and the maximal output value of Unit B is Df (B, m, n), if the Mth bit of the data code is denoted with Formula 5, then it's value is "1", otherwise, it's value is "0". wherein the Formula 5 is represented as follows:

$$\sum_{n=1}^{Dn} Df(A, M, n) \geq \sum_{n=1}^{Dn} Df(B, M, n)$$ [Formula 5]

However, if N<Rn, the add operation of Df will run until n=1~Rn+1.

The above illustration is about the repeated embedding data code. However, if error-correcting code is introduced during data encoding process, it needs not to embed the data symbol unit repeatedly.

The first embodiment of the invention has been described with reference to the drawings. Following terms in the present invention should be noted.

(1) Different arrangements of the dots are used to represent the embedding information, which is not change along with changes of the original document's font, word space and row space.

(2) Density (dot number per certain area) of the dot pattern been distributed the symbol is equal to that of the dot pattern not been distributed the symbol. Thus, for naked eye, the document is appended with reticulation texture of same density, and the watermark information is inconspicuous.

(3) If the dot pattern been distributed the symbol and the dot pattern not been distributed the symbol are encrypted, it will hardly to unscramble the embedded information.

(4) The image representing the information is substantially a combination of the unit images and is embedded entirely as a backdrop of the document. Thus, even if an embedding arithmetic is opened, it is hard to tamper the embedded information of the print document.

(5) The embedded signal is detected according to shade variety in wave' DOA (direction of arrival). It needs not to be precision-detected with respect to one pixel unit. Therefore, the embedded information can be detected reliably even there are some spots on the print document.

(6) The same information is embedded repeatedly, and such embedded information is reversed during detecting process. Even if the font of the word is relatively big and overlaps partial of signals, or some information is vanished due to spots on the print document, etc, the embedded information can also be detected reliably.

(7) Because unit images with special value are continuously configured around the watermark information area, even if the containing watermark document 200 is folded, stretched, etc, the watermark information area can also be detected correctly. Thus, a reliably detection method of the watermark information is obtained.

Second Embodiment

A second embodiment of the present invention provides a method for using a PN (Pseudorandom Number or Pseudorandom Noise) code to diffuse watermark information (that is, to represent bits or other units of watermark information using the PN code) so as to generate representational watermark information that is used in a watermark image.

Figure 22:
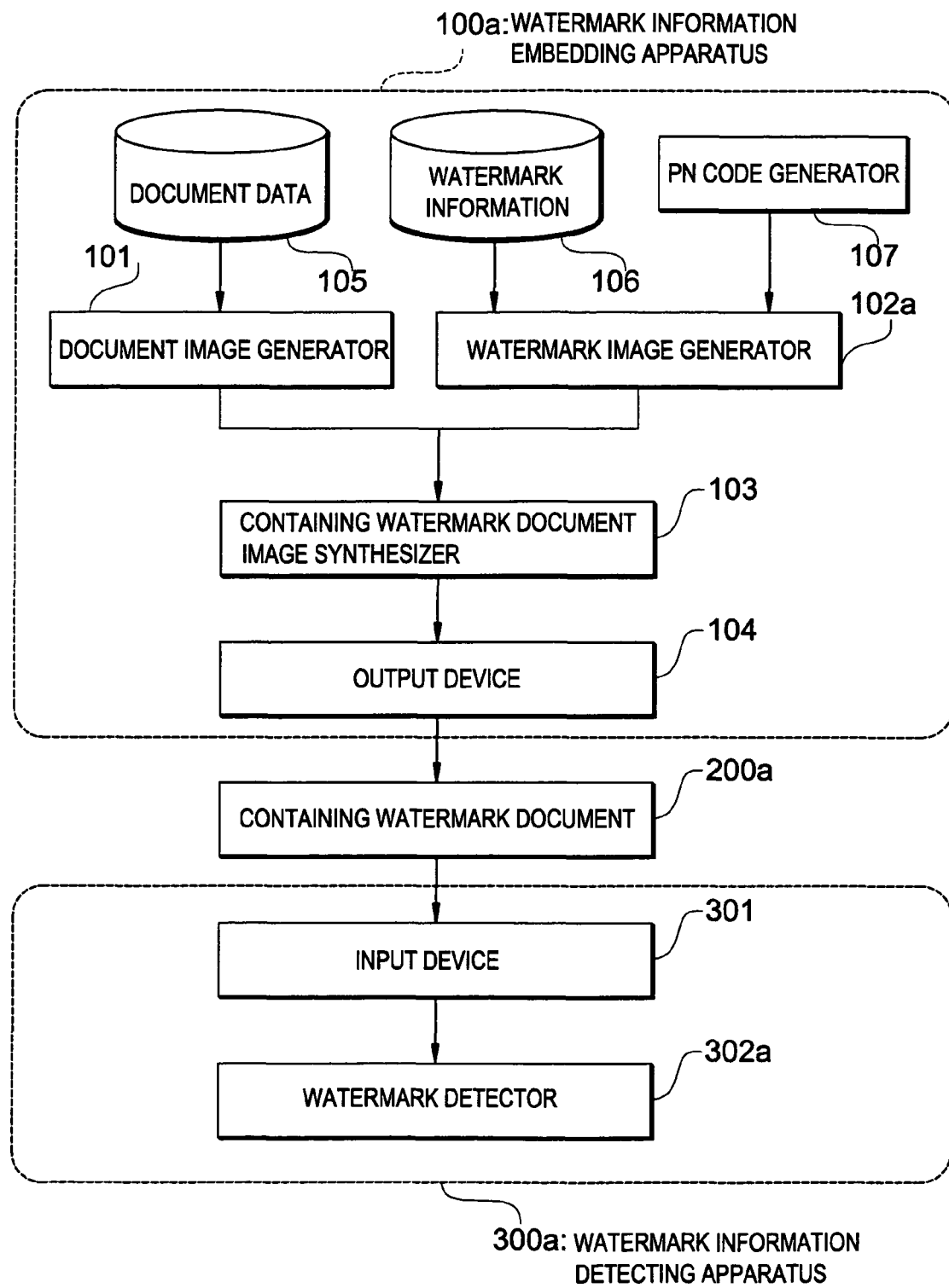
FIG. 22 is a block diagram of a watermark information embedding apparatus and a watermark information detecting apparatus in a second embodiment according to the present invention.

FIG. 22 is a configuration of the second embodiment in the present invention.

The apparatus shown in FIG. 22 is composed of a watermark information embedding apparatus 100a and a watermark information detecting apparatus 300a. A containing watermark document 200 is the containing watermark document generated by the watermark information embedding apparatus 100a.

As shown in FIG. 22, the watermark information embedding apparatus 100 comprises a document image generator 101, a watermark image generator 102a, a containing watermark document image synthesizer 103 and an output device 104, document data 105, watermark information 106 and PN (Pseudo Noise) code generator 107. The mentioned document image generator 101, containing watermark document image synthesizer 103, output device 104, document data 105 and watermark information 106 in the second embodiment are same to those in the first embodiment and are denoted with same symbols, description about those elements is omitted here. The PN code generator 107 generates PN codes according to the watermark information. The watermark image generator 102a generates a watermark image by diffusing the PN codes. The PN code generator 107 utilizes known method, which will be discussed later, to generate the PN codes (pseudo random sequence).

The watermark information detecting device 300a comprises an input device 301 and a watermark detector 302a. The watermark detector 302a is correlative with the PN code. The watermark detector 302a is provided to detect the watermark information area, read out the watermark information from the watermark information area, discriminate whether the watermark information has been detect correctly according to the peak value of the correlation value of the PN codes. If the watermark information is not correctly detected out from the watermark information area, the watermark detector 302a runs prescript correction function.

First to illustrate the PN code before discuss all steps of the watermark information embedding apparatus 100a.

Here first to discuss the longest code sequence. The longest code sequence is the code column of n bit. Wherein the number of "0" and "1" is equal or it's discrepancy is less than one. Moreover, if the phases are same, the auto correlation of the longest code sequence is one, otherwise the auto correlation is zero or the code column of −1/n bit. The longest code sequence is used in code diffusion and synchronization modification of the synchronous and single-user CDMA (code Division Multiple Access). The longest code sequence is generated by summation feedback of a shift register of some length. For example, if n is used to represent the stage of the shift register, L=2 n−1 is represented length of the longest code sequence, which is generated by a shift register code generator, as will be discussed later.

Figure 23:
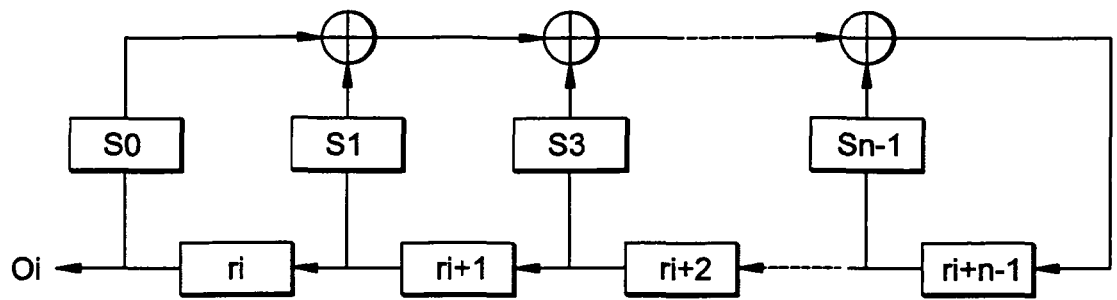
FIG. 23 is a schematic view showing configuration of the shift register code generator.

FIG. 23 is a schematic view showing configuration of the shift register code generator.

As seen in FIG. 23, rj is represented status of each shift register, si is represented multiplier coefficient (0 or 1) of each shift register. The shift register code generator is composed of a multilevel feedback logic-coupling loop. The longest code sequence generated by the shift register code generator is oj, which can be calculated by following:

$$o_{i+n} = \sum_{j=0}^{n-1} s_j r_{i+j} \quad \text{[Formula 6]}$$

Figure 24:
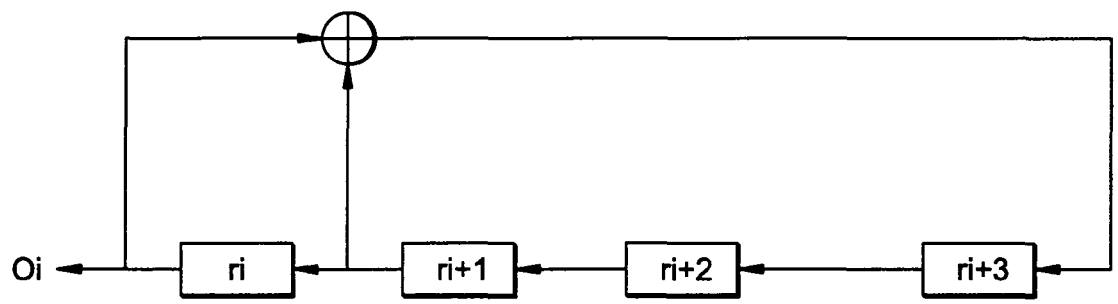
FIG. 24 is a schematic view showing configuration of 4 longest code sequence generator.

FIG. 24 is a schematic view showing configuration of 4 longest code sequence generator.

If In FIG. 23, s0=1, s1=1, s2=s3=0, the initial value of the shift register is 0001, the code generator shown in FIG. 4 will generate the longest code sequence of fifteen periods (sequence length is 15), which can be represented as "000100110101111 000100110101111 0001001 . . . ". It should be noted that unit of the underline is one period.

000100110101111 000100110101111 0001001 . . .

The auto correlation function of the longest code sequence is calculated by the average of the product of one period and values staggered bit by bit in time. For example, if the bit value as "1" of the code sequence is denoted with mi=1, the bit value as "0" is denoted with mi=−1, the auto correlation function can be expressed as following:

$$R(t) = \frac{1}{L}\sum_{i=0}^{L-1} m_i m_{i+t} \quad \text{[Formula 7]}$$

if tmodL=0, then the auto correlation value is 1, otherwise, the auto correlation is −1/L.

Figure 25:
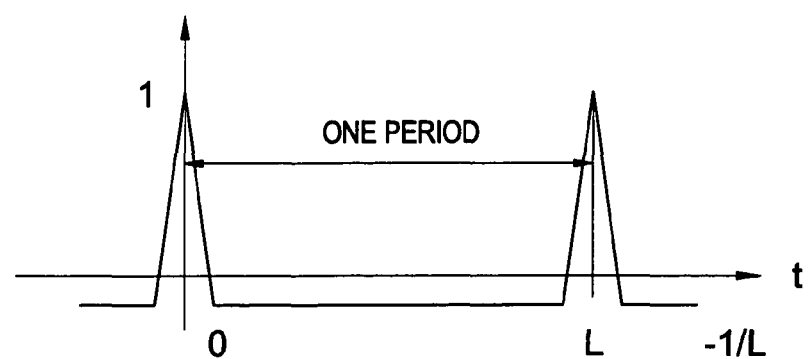
FIG. 25 is a schematic view showing an auto correlation function of the longest code sequence.

FIG. 25 is a schematic view showing the auto correlation function of the longest code sequence.

As shown in FIG. 25, when calculate correlation value of same longest code sequence, result of same phases is "1", while result of staggered phases is "−1/L". Therefore, it is easy to realize synchronization through calculating correlation between diffused signal of the longest code sequence and the longest code sequence used in diffusion.

Because the code sequences of same period are few, the longest code sequence utilizes combination of multiple shift register code generators to generate Gold sequence in the case of non-sync CDMA and mixed sequence.

Following is an illustration about the PN code generator 107 and watermark image generator 102a of FIG. 22, which are different with those in the first embodiment.

The PN code generator 107 generates the PN code. Utilize the PN code to generate the Gold sequence through the shift register code generator of FIG. 23, or Pseudo Random sequence by other methods. The sequence can be generated by dynamic generation method of the code generators, or static generation method of tables.

The watermark image generator 102a utilizes the PN code generated from the PN code generator 107 to diffuse the information bit column generated from the watermark information 106 thereby generating the watermark image.

Figure 26:
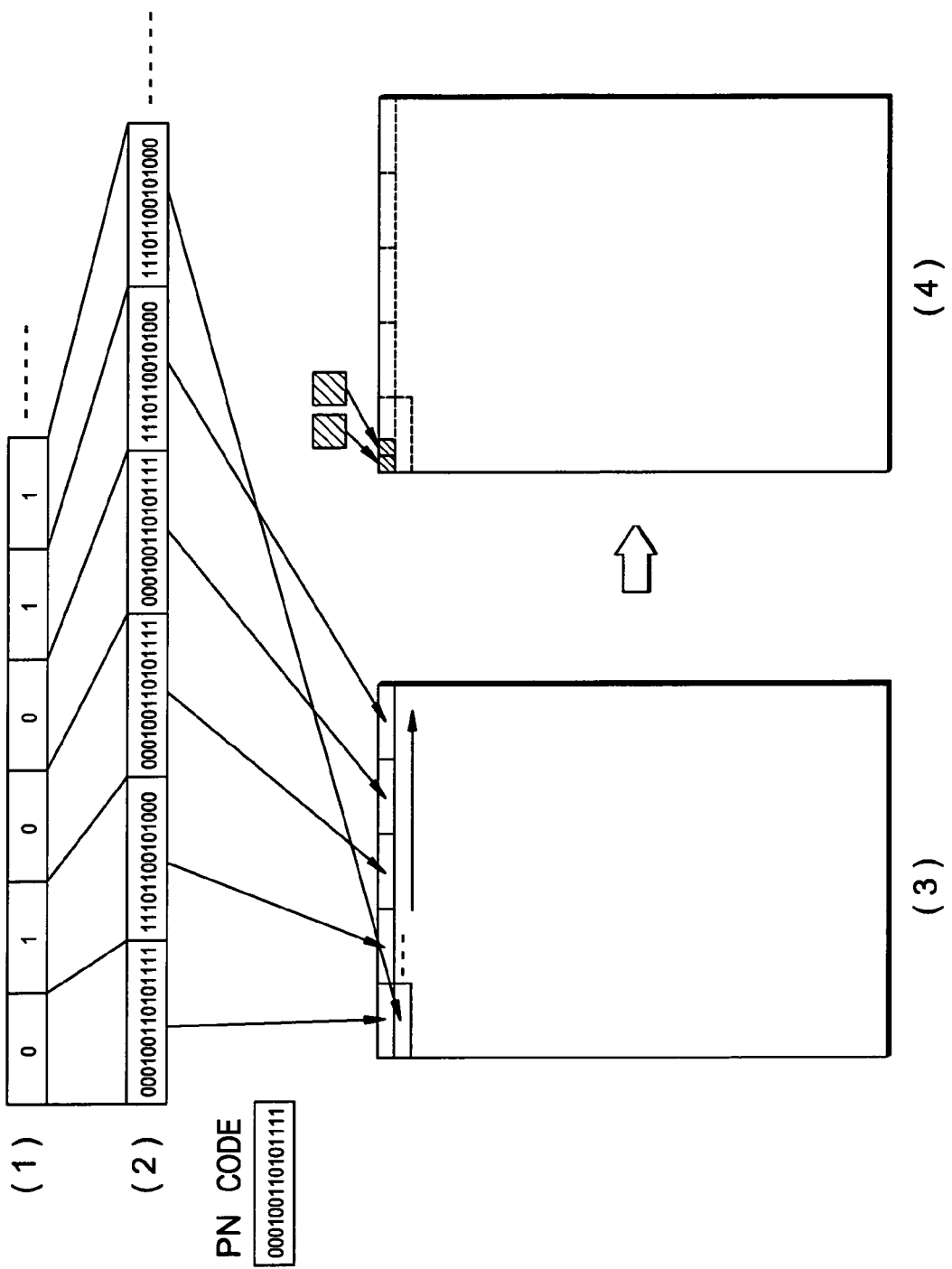
FIG. 26 is a schematic view showing generation of the watermark image.

FIG. 26 is a schematic view showing generation of the watermark image.

Method of utilizing the PN code to diffuse can be realized as follow rules:

(1) If the embedded information bit is "0", the PN code is used unbrokenly.

(2) If the embedded information bit is "1", the PN code is used after reversed operation.

(3) Each information bit quantity and the PN code are concatenated and embedded continuously with images.

In condition that the length of the PN code is 15 bits, the information bit N is diffused to (N×15) bits via using the PN code. The unit images of the diffused code sequence are clinker-built configured just like those in the first embodiment, so as to generate the watermark image. The unit images can be configured neither in transverse direction nor longitudinal direction. The example shown in FIG. 26 is the whole watermark image is generated by the diffusion of the PN code.

The watermark image is combined images diffused by the PN code sequence in the case of the unit image representation 1 bit. If the unit image represents 2 bits or more, the defused sequence can either be embedded in depth direction of bits (depth direction in condition that each bit is regarded as a bitplane), or be embedded only in a plane of special bit depth.

The following is a description about the watermark information detecting apparatus 300a focused on differences with those in the first embodiments.

The steps of the input device 301 in the second embodiment are same to that in the first embodiment. The watermark detector 302a calculates the correlation value of the signal outputted from the input device 301 and the PN sequence used in embedding process.

Figure 27:
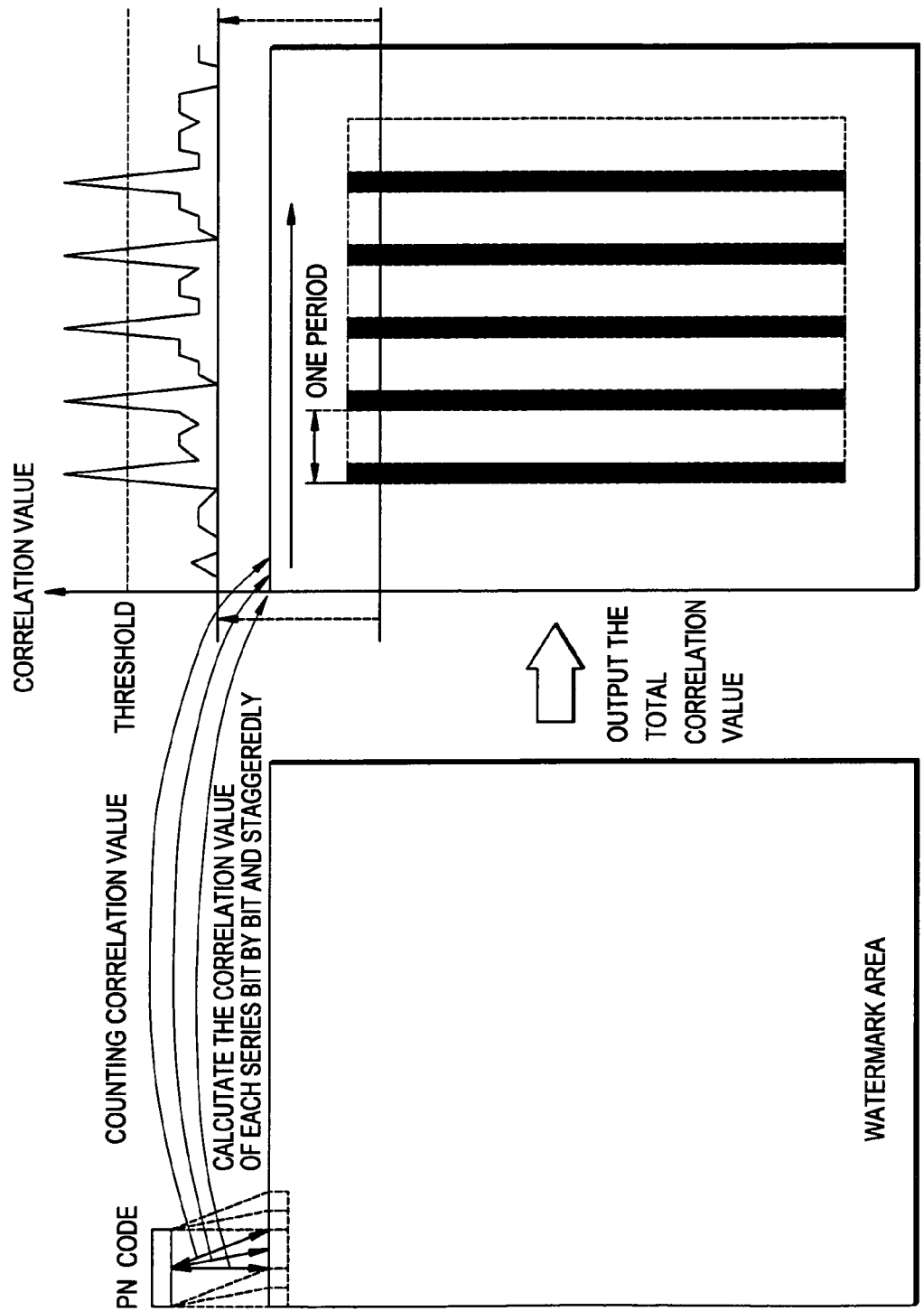
FIG. 27 is a schematic view showing process of the watermark detector.

FIG. 27 is a schematic view showing process of the watermark detector.

Calculate the correlation value according to an order of arrangement of the embedded PN sequence. For example, calculate the correlation value staggered bit by bit. If the embedded PN sequence is configured transversely, the staggered direction is a transverse direction, while if the embedded PN sequence is configured longitudinally, the staggered direction is a longitudinally direction.

If the phase is zero, the correlation value of the longest code sequence is "1", or the correlation value is "−1/L". Therefore, among the output values of the filters of the watermark detector 302, the correlation value of the output values that are actually embedded as the watermark is high. The correlation values fluctuate according to noises, only high correlation values are detected via using thresholds so as to establish the position of the embedded watermark. If the embedded sequence is not the longest code sequence, the maximum correlation value appears in same phases, in-phase is also possible. The correlation value is worked out through the above mentioned [Formula 7] and can also be expressed as following:

(correlation value)=|(the consistent numbers between the code and the PN code)−(the inconsistent numbers between the code and the PN code)|÷ (the length of the PN code)

As seen in the above expression, the maximum correlation value is not always reset to "1". Same PN code sequences are configured in row unit synchronized. Correlation of the PN code sequence is shown in FIG. 27 (2).

The diffused value can be got according to the above mentioned rules (1)~(3) of the watermark information embedding apparatus 100a and following conditions.

(the consistent numbers between the code and the PN code)≧(the inconsistent numbers between the code and the PN code): 0

(the consistent numbers between the code and the PN code)<(the inconsistent numbers between the code and the PN code): 1

The combination of the code sequences is detected as the watermark image area. The correlation value between such code sequence and the PN code sequence is higher than the threshold.

The correlation with the PN code certainly occurs in the period interval of the PN code. In condition that the interval is over the PN code period, because of the scanned paper is stretched, etc, clearance may be occurs in signal interval, and improper information may be extracted. In this case, in this embodiment, data of the interval is deleted so as to overcome the mentioned problems. In the case of the interval is not reach the PN code period, if information is lost during detecting process due to paper's folds, dummy data (for example, all bits are "0") are introduced in so as to amend the lost information. In the case of deleting information and introducing dummy data, error odds here are increasing. In order to establish signal synchronization of the entire containing watermark document 200a, error correction code and data code are synchronized thereby improving correction detection odds.

Moreover, information's deletion/introduction are taken place in the maximum interval in signal detecting by filter (the above mentioned step S304) so as to decrease error odds.

The above illustration is about diffusion process of the entire watermark image by the PN code. However, it also can carry through only around the watermark area or in partial area within the outline of watermark image just like the first embodiment. In this case, utilize establishing new rules about arrangement of information, which are defused by the PN code, to extract the watermark image and amend the improper information generated by factors of folding, stretching, etc.

As discussed above, the second embodiment discloses a method for using the PN code to diffuse the watermark information so as to generate the watermark image. The second embodiment is of all effects of the first embodiment. Furthermore, in the second embodiment, in the case of detecting the watermark information, the detection precision is increased. Therefore, even if the information is lost for folding or stretching factors, the second embodiment can provide corresponding process, such as introducing into error correction code, to increase proper extraction odds.

Third Embodiment

A third embodiment of the present invention provides examples of using multiple PN codes according to row unit or column unit.

The configuration of the third embodiment is same to the second embodiment. Referring to FIG. 22 again, a PN code generator 107 in the third embodiment can generate multiple PN code sequences. A watermark image generator 102a in the third embodiment can utilize the multiple PN code sequences generated by the PN code generator to perform diffusion process with respect to row unit or column unit thereby generating watermark image. Other elements of the third embodiment are same to those in the second embodiment, a detailed description is omitted here.

Following is a discussion about using the multiple PN code sequences (there are two difference PN code sequences in this embodiment) to perform the diffusion process with respect to row unit.

Firstly, processes of the watermark information embedding apparatus 100a are given.

The PN code generator 107 generates N kinds of difference PN code sequences (in this example, there are two kinds: PN Code A sequence, PN Code B sequence). The watermark image generator 102a generates a watermark image by using the PN code sequence to diffuse with respect to each row unit. For example, there are N kinds of PN code sequences, PN code of the first row is "0", PN code of the second row is "1", ..., PN code of the Nth row is "N−1", PN code of the (N+1)th row is "0".... The PN code sequence is switched for diffusion according to such rule. Other processes in the third embodiment are same to those in the second embodiment.

After that, processes of the watermark information detecting apparatus 300a are discussed.

Figure 28:
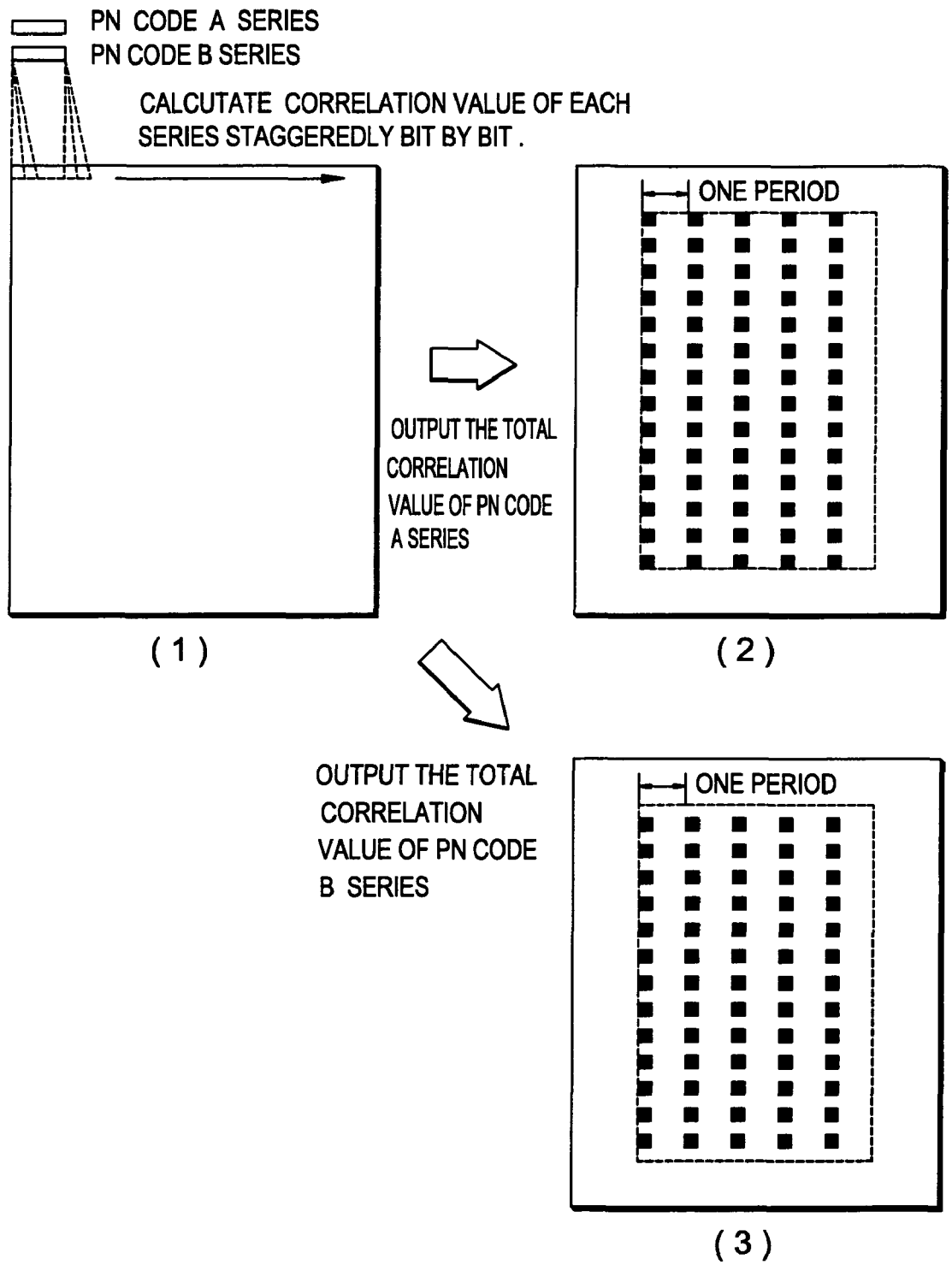
FIG. 28 is a schematic view showing processes of a third embodiment (part one)

FIG. 28 is a schematic view showing processes of a third embodiment (part one).

As shown if FIG. 28 (1), calculate total correlation value of the output value (the value extracted according to unit image, referring to FIG. 17) from the filter of the watermark detector 302a and the N kinds of PN code sequences used in embedding process. In this example, it is supposed that N=2.

If the longest code sequence and the Gold code sequence are used as the PN code sequence, the correlation between those sequences and other code sequences is lower. Only when sequences are same and synchronous to those used in embedding, the correlation values are greater.

The PN code kind from which can get peak correlation value is substantially presumed as address of the row unit. For example, rows of greater correlation with the PN Code A sequence are the first row and the (n+1)th row (n is a natural number which is equal to 1 or more). Rows of greater correlation with the PN Code B sequence are the second row and the (n+1)th row (n is a natural number which is equal to 1 or more). Therefore, number 0~n of the PN Code can be regarded as row address of the embedded information. If there are difference between the actual address and the row address, methods of deleting information, inserting dummy data or others can be used to correction the difference so as to obtain proper address that same to the original address.

If the dummy data are inserted in the case of deletion information, detection error odds here are increasing. In order to obtain all signals' synchronization, synchronize the error correction codes and data codes so as to increase proper detection odds. Furthermore, methods of deletion information and insertion dummy data are carried through in the maximum interval of the signal detection so as to decrease error odds.

Following is an illustration of using the multiple PN code sequences to perform the diffusion process with respect to column unit.

Firstly, processes of the watermark information embedding apparatus 100a are given.

The PN code generator 107 generates N kinds of difference PN code sequences (in this example, there are two kinds: PN Code A sequence, PN Code B sequence). The watermark image generator 102a generates a watermark image by using the PN code sequence to diffuse with respect to each column unit. When there are N kinds of PN code sequences, PN code of the first column is "0", PN code of the second column is "1", ..., PN code of the Nth column is "N−1", PN code of the (N+1)th column is "0" .... The PN code sequences are switched for diffusion according to such rule.

Processes of the watermark information detecting apparatus 300a are discussed as following.

Figure 29:
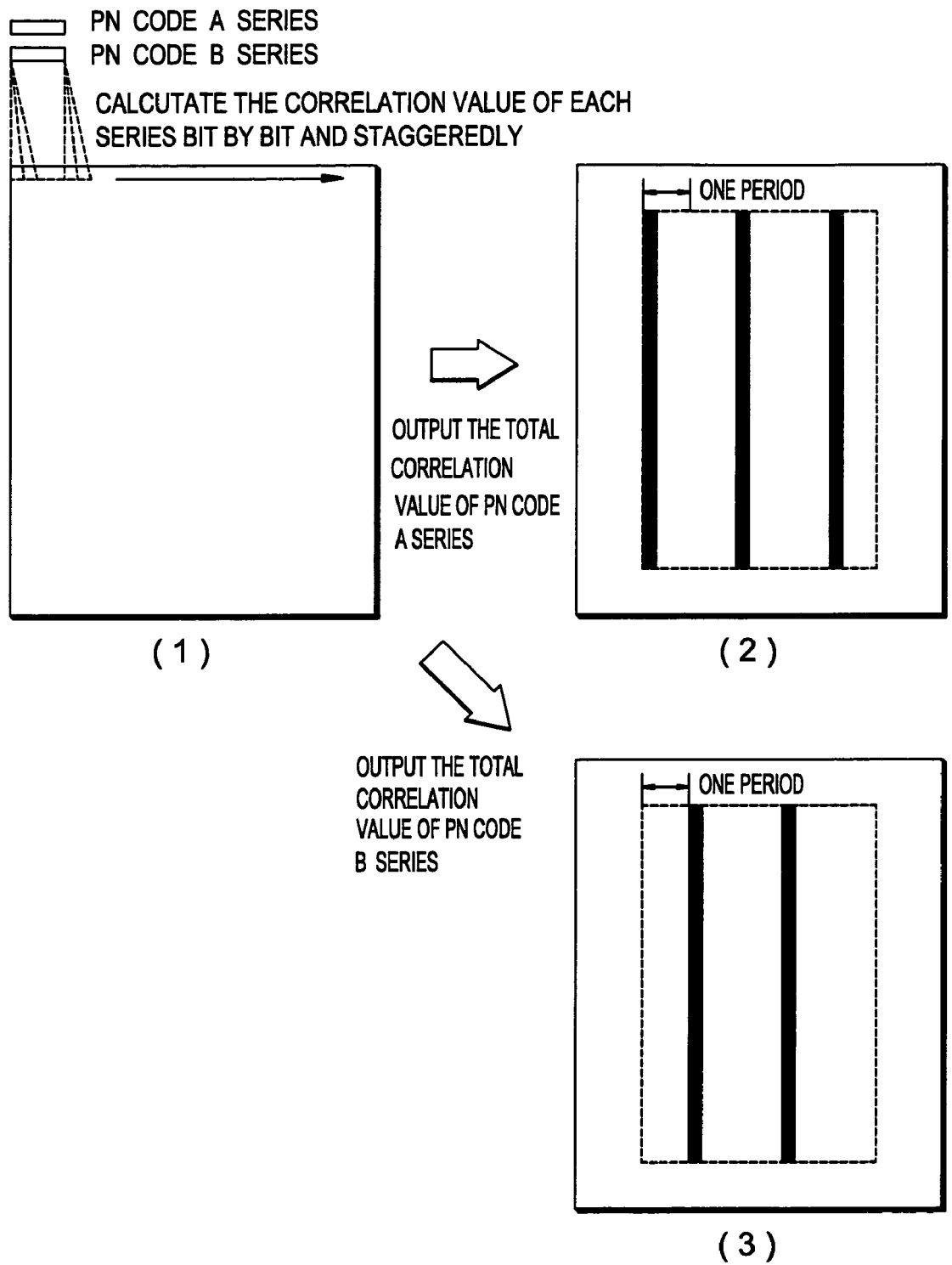
FIG. 29 is a schematic view showing processes of the third embodiment (part two)

FIG. 29 is a schematic view showing processes of the third embodiment (part two).

As shown if FIG. 29 (1), similar to the row unit, calculate total correlation value of the output value (the value extracted according to unit image) from the filter of the watermark detector 302a and the N kinds of PN codes used in embedding process. In this example, it is supposed that N=2.

The PN code's kind from which can get peak correlation value is substantially presumed as address of the column unit. For example, columns of greater correlation with the PN Code A sequence are the first column and the (n+1)th column (n is a natural number which is equal to 1 or more). Columns of greater correlation with the PN Code B sequence are the second column and the (n+1)th column (n is a natural number which is equal to 1 or more). Therefore, number 0~n of the PN Code sequences kind can be regarded as column address of the embedded information. If there are difference between the actual address and the column address, methods, such as deleting information, inserting dummy data, etc, can be used to correction the difference so as to obtain proper address that same to the original address.

If the dummy data are inserted in the case of deletion information, detection error odds here are increasing. In order to obtain all signals' synchronization, synchronize the error correction codes and data codes so as to increase proper detection odds. Furthermore, methods of deletion information and insertion dummy data are carried through in the maximum interval of the signal detection so as to decrease error odds.

As discussed above, the third embodiment discloses a method for using the PN code to diffuse the watermark information with respect to each row unit or column unit so as to generate the watermark image. The third embodiment is of all effects of the second embodiment. Furthermore, in the third embodiment, signals' absolute addresses are embedded, so errors generated for folding or stretching can be corrected. Therefore, even the information in transverse and longitudinal are asynchronous for factors of folding or stretching, the third embodiment can provide corresponding process to synchronize the information, thereby increasing proper extraction odds.

Fourth Embodiment

A fourth embodiment of the present invention is an example of two-dimensional PN code.

The configuration of the fourth embodiment is same to the second embodiment. Referring to FIG. 22 again, a PN code generator 107 in the fourth embodiment can generate multiple PN code sequences. A watermark image generator 102a in the fourth embodiment can utilize the multiple PN code sequences generated by the PN code generator to perform diffusion process thereby generating the watermark image. Other elements of the fourth embodiment are same to those in the second and third embodiments, a detailed description is omitted here.

The following description is about processes of the watermark information embedding apparatus 100a. The PN code generator 107 generates two-dimensional codes.

Figure 30:
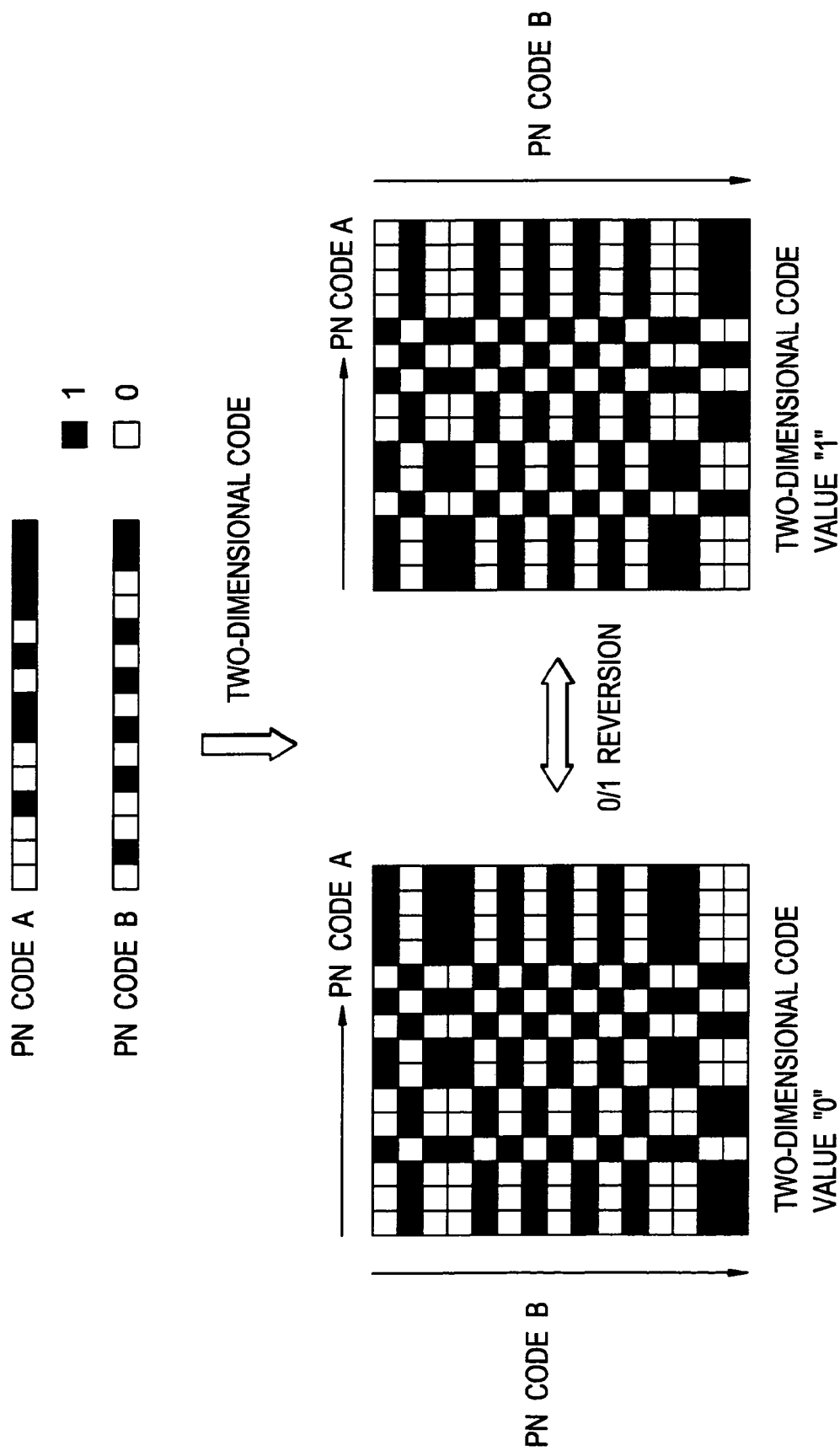
FIG. 30 is a schematic view showing two-dimensional PN code sequence.

FIG. 30 is a schematic view showing two-dimensional PN code sequence.

As shown in FIG. 30, the PN code sequence generated in a horizontal direction are PN Code A sequence, and in a vertical direction are PN Code B sequence. The bit values of the PN Code A sequence and the PN Code B sequence are reversed. For example, bit value of the second PN Code A from top beginning is equal to the bit value of the second PN Code B from top beginning. Each bit value is reversed. Each bit value of the two-dimensional PN code representation "0" is reversed to that of the two-dimensional PN code representation "1".

The watermark image generator 102 generates a watermark image via diffusion process through using the two-dimensional PN code. In this embodiment, the watermark information is diffused by the two-dimensional PN code. Other procedures in this embodiment are same to those in the second embodiment.

Processes of the watermark information detecting apparatus 300a are discussed as following.

Figure 31:
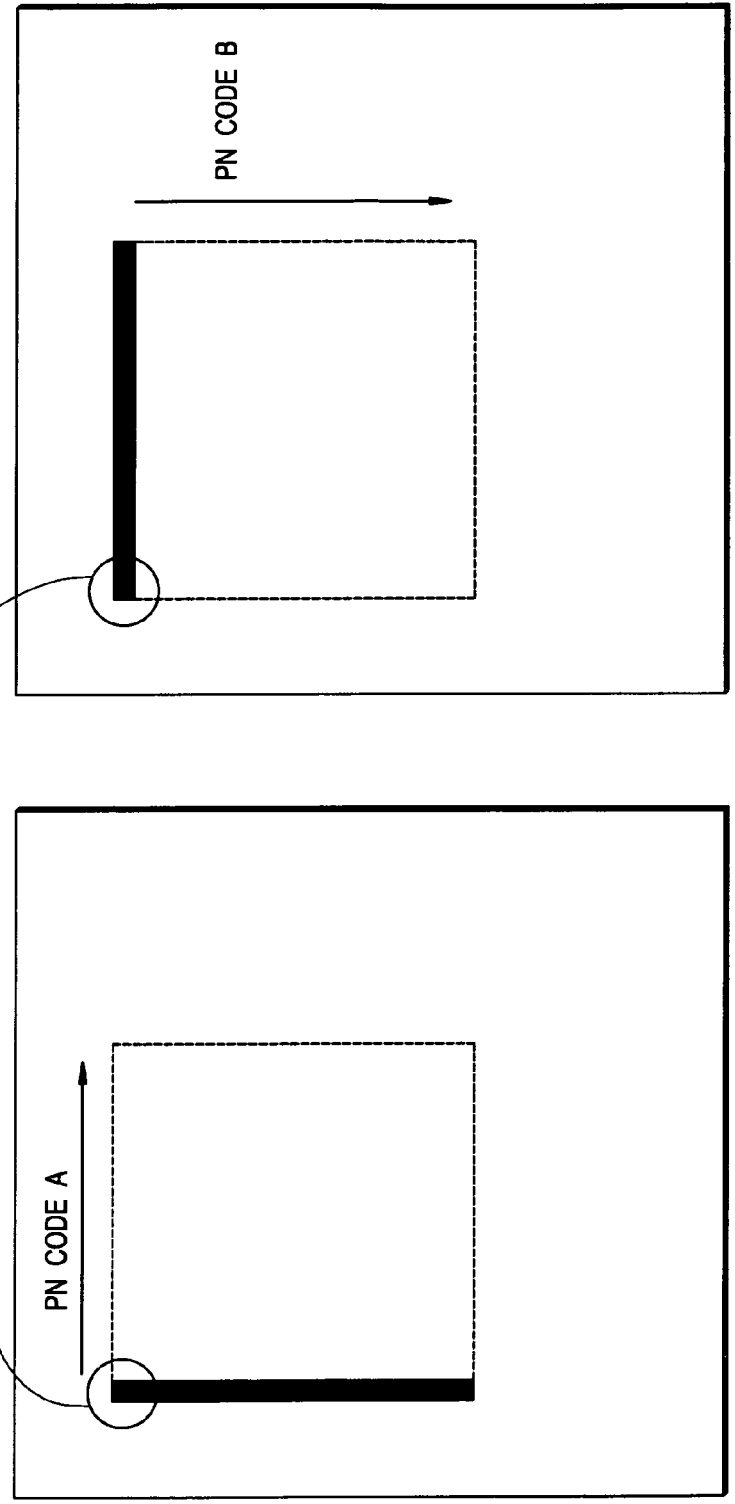
FIG. 31 is a schematic view showing detecting process of the two-dimensional PN code sequence in the fourth embodiment.

FIG. 31 is a schematic view showing detecting process of the two-dimensional PN code in the fourth embodiment.

When the watermark detector 302a detect the two-dimensional PN code sequence, the PN code sequences in the horizontal and vertical direction are used respectively to calculate the correlation values. As seen in FIG. 31 (1), when calculate the correlation value of the horizontal PN code sequence, the peak correlation values appear continuously in the vertical direction. As shown in FIG. 31 (2), when calculate the correlation value of the vertical PN code sequence, the peak correlation values appear continuously in the horizontal direction. The points of intersection of such continuous peak correlation values are the vertexes of the two-dimensional PN code sequence. The address and range of the two-dimensional PN code sequence can be calculated according to the vertexes of the two-dimensional PN code sequence.

Figure 32:
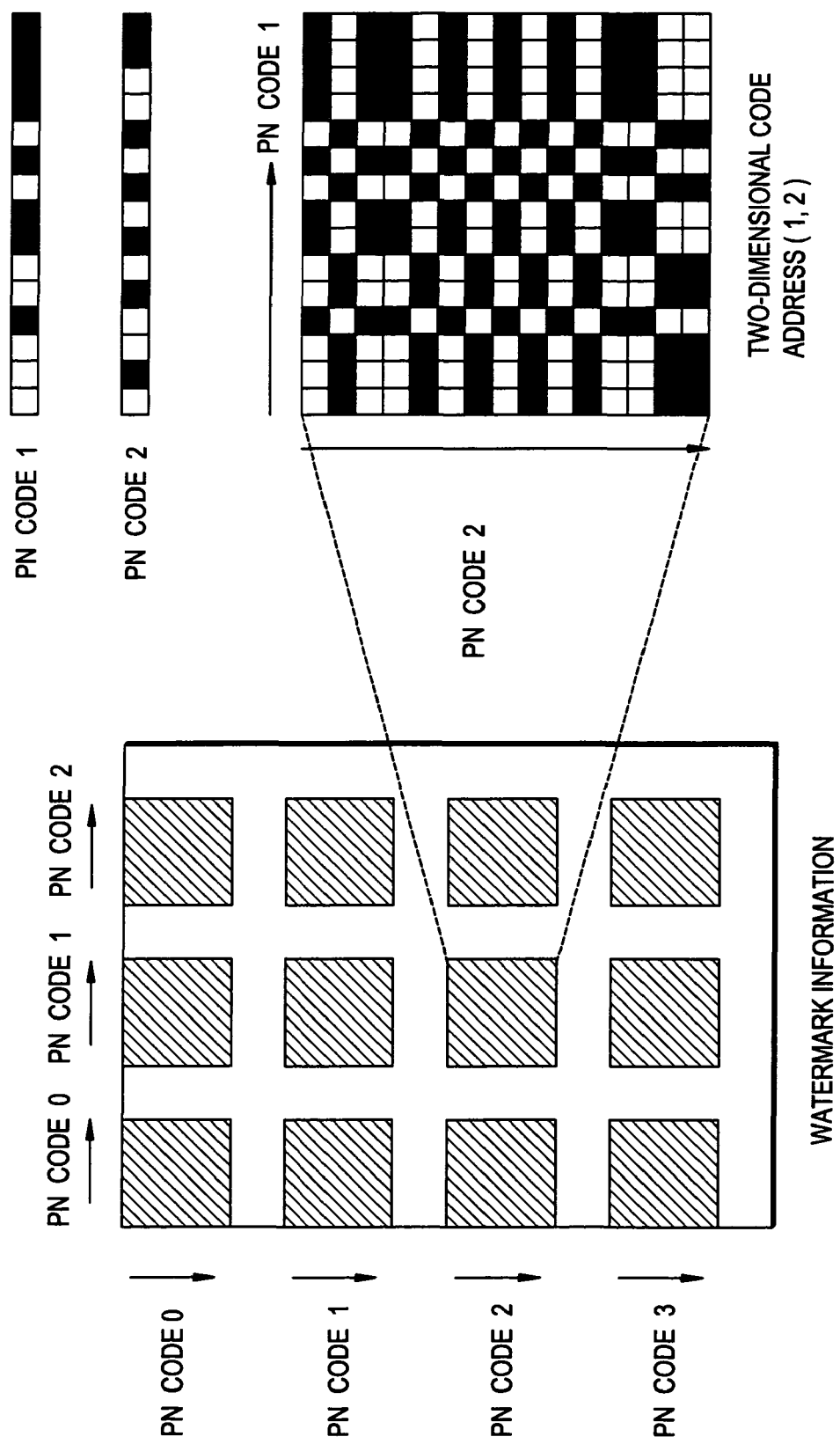
FIG. 32 is an example of two-dimensional PN code sequence.

FIG. 32 is an example of two-dimensional PN code sequence.

As shown in FIG. 32, the two-dimensional PN code sequence is configured with PN code 0, PN code 1, PN code 2, ... in a horizontal and vertical direction respectively. For example, the two-dimensional PN code sequence in FIG. 32 is configured with bit array of the PN code 1 in the horizontal direction and bit array of the PN code 2 in the vertical direction. Each two-dimensional PN code sequence includes inherent row address and column address. As a result, the location of the two-dimensional PN code can be detected reliably from the detection side.

As discussed above, in the fourth embodiment, the two-dimensional PN code is taken as the diffusion PN code to diffuse the watermark information. The fourth embodiment is of all effects of the second embodiment. Furthermore, in the fourth embodiment, since a two-dimensional PN code has row address and column address, the location of the two-dimensional PN code is confirmed. As a result, even the containing watermark document 200a is folded or stretched; the watermark information can also be extracted correctly.

Fifth Embodiment

A fifth embodiment in the present invention is an example of three-dimensional PN code.

The configuration of the fourth embodiment is same to the second embodiment. Referring to FIG. 22 again, document data 105 to be embedded in the fifth embodiment is not one page, but multipage. The document image generator 101 can generate a document image from such multipage document data. The PN code generator 107 in the fifth embodiment generates three-dimensional PN code sequence from the multipage document data. The watermark image generator 102a utilizes the three-dimensional code sequence generated from the PN code generator 107 to diffuse the watermark information 106 so as to generate the watermark image. Other configurations are same to those in the second and fourth embodiments.

Processes of the watermark information embedding apparatus 100a are discussed as following.

The PN code generator 107 generates three-dimensional code sequence.

Figure 33:
FIG. 33 is an example of three-dimensional PN code sequence.
Figure 33:
Figure 33:
Figure 33:
Figure 33:
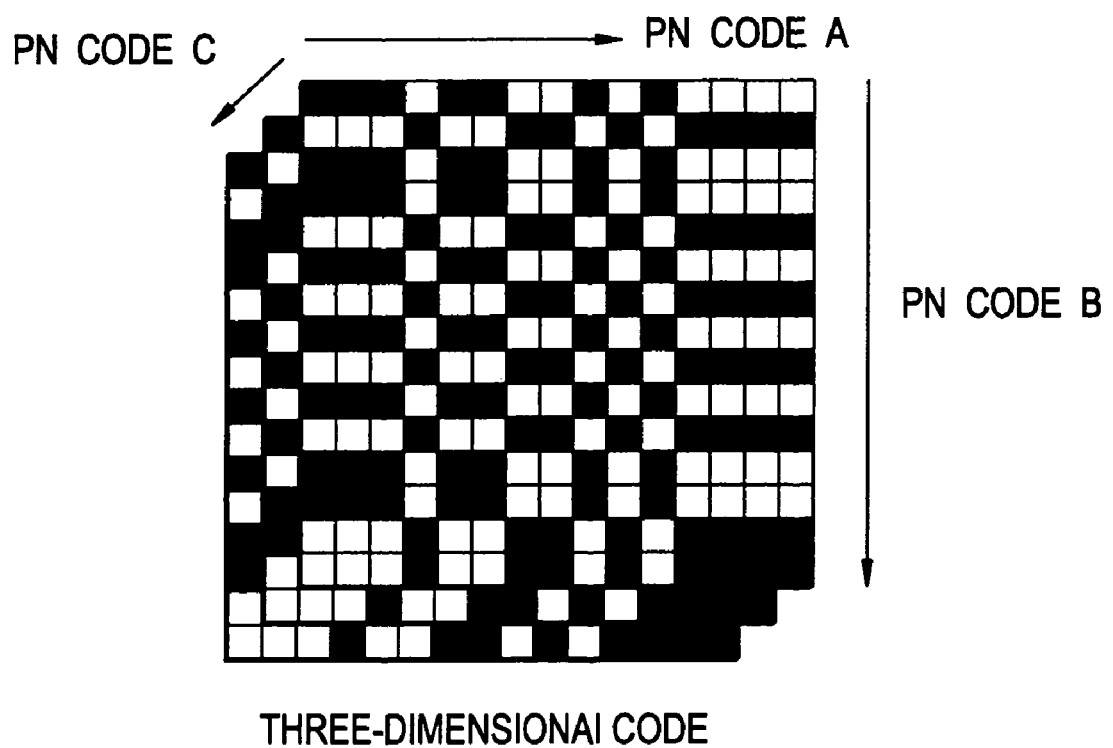

FIG. 33 is an example of three-dimensional PN code sequence. Referring to FIG. 33, the three-dimensional PN code is configured by generating PN Code C in a page direction on the basis of a two-dimensional PN code which includes PN Code A in a horizontal direction and PN Code B in a vertical direction. The two-dimensional PN code is identical with that in the fourth embodiment, a detailed description about the two-dimensional PN code is omitted here.

The watermark image generator 102a utilizes the three-dimensional PN code to diffuse the watermark information so as to generate the watermark image. The two-dimensional PN code (including PN Code A and PN Code B) of each plane in the three-dimensional PN code is embedded in each page of the multipage document image.

Description about processes of the watermark information detecting apparatus 300a is given as following.

When the watermark detector 302a detect out the watermark information form the containing watermark document 200 having multipage document data, the watermark detector 302a extracts the two-dimensional PN code from each page. The process of extracting the two-dimensional PN code is same to that in the fourth embodiment, a detailed illustration about this is omitted here. Calculate correlations of each plane value of the two-dimensional code and multi PN codes in the page direction (PN Code C sequence). If the correlation is lower, it is shown that page's deletion or insertion procedure is carried through. Other processes of the fifth embodiment are same to those in the second and fourth embodiments.

In the fifth embodiment, the two-dimensional PN code is expanded to form the three-dimensional PN code. Thus, the fifth embodiment is of all effects of the second embodiment. Furthermore, in the fifth embodiment, even the containing watermark document 200a consists of multipage document data; the watermark information can also be detected correctly.

As discussed above, because the watermark image area is surrounded by the dot pattern with special value, the watermark image area can be detected correctly. As a result the watermark information can be detected correctly. Moreover, the present invention utilizes the PN code sequence to diffuse the watermark information, so the watermark image area can be detected correctly, and the signal aberration owing to image aberration and folding can be corrected. As a result, the watermark's detection is not easy to be effected by factors of folding, stretching, etc.

Following terms of the present invention should be noted.

(a) In the first embodiment, the unit images surround the outline of the watermark area. However, if the important document, just like the two adjacent sides of the rectangle, can make an explicit record area of the watermark information, it needs not to overlap fully around the outline of the watermark information area. In the embodiments 1 through 5, the record area as the watermark information area is not limited to rectangle, other shape such as roundness is also accepted. In the first embodiment, the value of the watermark information record area's outline is defined as special value, so any shape of the record area will get the same effect. In the example in the first embodiment, the value of the outline is "1". However the value "0" of the outline is also accepted.

(b) In the embodiments 2 through 5, as long as the embedding side and the detecting side have the common normalized code sequence, the longest code sequence (M sequence), the Gold code sequence, or other random code sequence can be used as the PN code sequence, (c) In the fifth embodiment, the three-dimensional PN code sequence is used as the embedding/detecting PN code sequence. The embedded information which is not only the static image, but also the cube such as dynamic image with multi-frame, three-dimensional object, etc, can be detected. If the embedded information is the dynamic image with multi-frame, the frame number and the address are detected. Vanish and insertion of the frame can also be detected in condition that the embedded information is the dynamic.

(d) In the embodiments 2 through 5, the information to be diffused by the PN code can not only be the total of the digital watermark area but also be the outline (outline border) of the digital watermark area. The unit images can be configured around the outline of the watermark area at fifty pixels intervals or at random regular intervals. However, the configuration rule at the embedding side and the detecting side are identical.

(e) In the embodiments 2 through 5, the watermark information is represented by configuring dot pattern around the watermark image in one surface. However, the present invention is not limited to this method. As long as the method like the watermark information 106 embedded in the document is also accepted.

(f) In the embodiments 1 through 5, the containing watermark document 200, 200a is paper print document. However, the containing watermark document can also be other medium, such as image on the display.

What is claimed is:

1. A watermark information embedding apparatus, comprising:
    a document image generating section for generating a document image;
    a PN code generating section for generating a plurality of PN code sequences;
    a watermark image generating section for diffusing units of watermark information using the PN code sequences, generating representational watermark information, and generating a watermark image in which the diffused units of watermark information are redundantly denoted by dot patterns that are repeated at a plurality of locations;

a synthesizing section for overlapping the document image and the watermark image so as to generate a watermarked document image; and a printer that prints the watermarked document image on a recording medium wherein the units of watermark information are represented by bits, wherein the watermark image generating section diffuses each bit of watermark information by representing the respective bit by one of the PN code sequences if the respective bit has a first value and by representing the respective bit by a modified version of the one of the PN code sequences if the respective bit has a second value, and wherein the watermark generating section uses a first one of the PN code sequences and a modified version of the first one of the PN code sequences for all of a first row or column to diffuse watermark information and uses a second one of the PN code sequences and a modified version of the second one of the PN code sequences for all of a second row or column to diffuse watermark information.

2. The watermark information embedding apparatus according to claim 1, wherein the PN code generating section generates an array of two-dimensional PN code sequences in a row direction and a column direction.

3. The watermark information embedding apparatus according to claim 1, wherein there is at least one dot pattern representing special watermark information.

4. The watermark information embedding apparatus of claim 1, wherein said one of the PN code sequences includes a particular PN code sequence and the modified version of said one of the PN code sequences has bits that are inverted from the bits of the particular PN code sequence.

5. The watermark information embedding apparatus of claim 1, wherein the first and second PN code sequences have bits, wherein the modified version of the first PN code sequence is formed by inverting the bits of the first PN code sequence, and wherein the modified version of the second PN code sequence is formed by inverting the bits of the second PN code sequence.

6. A watermark information embedding apparatus comprising:

a document image generating section for generating a multipage document image;

a PN code generating section for generating a two dimensional array of PN sequences that together form a three-dimensional PN code group representing a row direction, a column direction, and a page direction respectively;

a watermark image generating section for diffusing units of watermark information using the array of two-dimensional PN code sequences, generating a sequence of representational watermark pages, and generating a multipage watermark image in which the diffused units of watermark information are redundantly denoted by dot patterns that are repeated at a plurality of locations;

a synthesizing section for overlapping the multipage document image and the multipage watermark image so as to generate a watermarked document image; and a printer that prints the watermarked document image on a recording medium, wherein the watermark generating section uses a first one of the PN code sequences and a modified version of the first one of the PN code sequences for all of a first row or column to diffuse watermark information and uses a second one of the PN code sequences and a modified version of the second one of the PN code sequences for all of a second row or column to diffuse watermark information, wherein the units of watermark information are represented by bits, and wherein the watermark image generating section diffuses each bit of watermark information by representing the respective bit by at least one of the PN code sequences if the respective bit has a first value and by representing the respective bit by a modified version of the at least one of the PN code sequences if the respective bit has a second value.

7. The watermark information embedding apparatus of claim 6, wherein the first and second PN code sequences have bits, wherein the modified version of the first PN code sequence is formed by inverting the bits of the first PN code sequence, and wherein the modified version of the second PN code sequence is formed by inverting the bits of the second PN code sequence.

8. A watermark information detecting apparatus for extracting units of watermark information, which is diffused by a plurality of PN code sequences and redundantly denoted by dot patterns that are repeated at a plurality of locations in a watermark image, from a document, comprising:

a scanner for scanning the document to produce a scanned image; and a watermark information detector which detects the diffused watermark information from the scanned image to extract the watermark image from the document, and which estimates an area occupied by the watermark information based on the watermark image and the plurality of PN code sequences, wherein the units of watermark information are represented by bits, wherein each bit of watermark information in at least one row or column is diffused by representing the respective bit by one of the PN code sequences if the respective bit has a first value and by representing the respective bit by a modified version of said one of the PN code sequences if the respective bit has a second value, wherein the watermark information detector calculates correlation values using different PN code sequences, detects a correlation peak value of each PN code sequence, and estimates row addresses and column addresses according to the correlation peak values, and wherein a first one of the PN code sequences is used by the watermark information detector to calculate correlation values for all of a first row or column and a second one of the PN code sequences is used by the watermark information detector to calculate correlation values for all of a second row or column.

9. The watermark information detecting apparatus according to claim 8, wherein the watermark information detector discriminates whether the watermark information is correctly detected according to at least one correlation peak value of the PN code sequences.

10. The watermark information detecting apparatus according to claim 8, wherein the watermark information detector calculates a correlation of a two-dimensional array of PN code sequences, which include different PN code sequences in a row direction and a column direction, so as to estimate the area occupied by the watermark information.

11. The watermark information detecting apparatus according to claim 8, wherein the document is a multipage document, and wherein the watermark information detector calculates a correlation of a three-dimensional group of PN code sequences, which include different PN code sequences in a row direction, a column direction, and a page direction, so as to estimate the area occupied by the watermark information.

12. The watermark information detecting apparatus according to claim 8, wherein there is at least one dot pattern representing special watermark information.

13. A method of embedding watermark information, comprising:
   generating a watermark image, the generating step including using a watermark information embedding apparatus to diffuse units of watermark information using a plurality of PN code sequences, the diffused units of watermark information being redundantly denoted in the watermark image by dot patterns that are repeated at a plurality of locations;
   combining the watermark image and a document image so as to generate a combined image; and
   outputting the combined image to a printer,
   wherein the units of watermark information are represented by bits, and
   wherein each bit of watermark information is diffused by representing the respective bit by one of the PN code sequences if the respective bit has a first value and by representing the respective bit by a modified version of the one of the PN code sequences if the respective bit has a second value, and
   wherein a first one of the PN code sequences and a modified version of the first one of the PN code sequences are used for all of a first row or column to diffuse watermark information and a second one of the PN code sequences and a modified version of the second one of the PN code sequences are used for all of a second row or column to diffuse watermark information.

14. The method of embedding watermark information according to claim 13, wherein there is at least one dot pattern representing special watermark information.

15. The method of claim 13, wherein the first and second PN code sequences have bits, wherein the modified version of the first PN code sequence is formed by inverting the bits of the first PN code sequence, and wherein the modified version of the second PN code sequence is formed by inverting the bits of the second PN code sequence.

16. A method for detecting watermark information using a watermark information detecting apparatus to extract units of watermark information from a document, the units of watermark information being represented by bits and being diffused by using a plurality of PN code sequences in a watermark image, the method comprising the steps of:
   (a) scanning the document with a scanner to produce a scanned image;
   (b) extracting the watermark image, step (b) including detecting the diffused units of watermark information;
   (c) calculating correlations between the watermark image and the plurality of PN code sequences; and
   (d) estimating an area occupied by the watermark information according to steps (b) and (c),
   wherein each bit of watermark information in at least a portion of the watermark image is represented by one of the PN code sequences if the respective bit has a first value and by a modified version of the one of the PN code sequences if the bit has a second value, and
   wherein step (c) comprises using a first one of the PN code sequences to calculate correlations for all of a first row or column and using a second one of the PN code sequences to calculate correlations for all of a second one of the rows or columns.

17. The method of detecting watermark information according to claim 16, wherein there is at least one dot pattern representing special watermark information.

18. A method for generating a watermarked document comprising:
   generating a watermark image, the generating step including diffusing units of watermark information and redundantly denoting the diffused units of watermark information by dot patterns that are repeated at a plurality of locations;
   combining the watermark image and a document image; and
   printing the document image onto a recording medium using a printer,
   wherein the units of watermark information are represented by bits,
   wherein the units of watermark information are diffused using a plurality of PN code sequences, one of the PN code sequences being assigned to all of a row or column of the watermark information and another of the PN code sequences being assigned to all of another row or column of the watermark information, and
   wherein each bit of watermark information is diffused by representing the respective bit by one of the PN code sequences if the respective bit has a first value and by representing the respective bit by a modified version of the one of the PN code sequences if the respective bit has a second value.

19. The method of claim 18, wherein said one of the PN code sequences includes a particular PN code and the modified version of said one of the PN code sequences has bits that are inverted from the bits of the particular PN code.

20. A watermark information embedding apparatus, comprising:
   a document image generating section for generating a document image;
   a PN code generating section for generating a plurality of PN code sequences, each PN code sequence having a plurality of bits;
   a watermark image generating section for diffusing prescribed units of watermark information using the PN code sequences, and generating a watermark image;
   a containing watermark document image synthesizer for overlapping the document image and the watermark image so as to generate a watermarked document image, and
   a printer to print the watermarked document image onto a recording medium,
   wherein the watermark image generating section utilizes the plurality of PN code sequences to represent the watermark information with respect to row units or column units of watermark information, with a first one of the PN code sequences and a modified version of the first one of the PN code sequences being used to diffuse all of a first one of the row or column units of watermark information and a second one of the PN code sequences and a modified version of the second one of the PN code sequences being used to diffuse all of a second one of the row or column units of watermark information, and
   wherein the modified version of the first PN code sequence is formed by inverting the bits of the first PN code sequence and the modified version of the second PN code sequence is formed by inverting the bits of the second PN code sequence.

21. The watermark information embedding apparatus according to claim 20, wherein the watermark image generating section assigns one of the PN code sequences to a row or column, and switches to another of the PN code sequences with respect to another row or column.

22. A watermark information detecting apparatus for extracting watermark information from rows and columns of a document, in which the watermark information is diffused by PN code sequences and the diffused watermark information is recorded as a watermark image, comprising:
   a scanner for scanning the document to produce a scanned image; and
   a watermark information detector which makes an explicit record area of the watermark information by extracting the watermark image from the scanned image and by calculating correlation of the PN code sequences with respect to the watermark image,
   wherein each bit of the watermark information in at least one of the rows or columns is represented by one of the PN code sequences if the respective bit has a first value and by a modified version of the one of the PN code sequences if the respective bit has a second value,
   wherein the watermark information detector calculates correlation values using different PN code sequences, detects a correlation peak value of each PN code sequence, and estimates row addresses or column addresses according to the correlation peaks, and
   wherein a first one of the PN code sequences is used by the watermark information detector to calculate correlation values for all of a first one of the rows or columns and a second one of the PN code sequences is used by the watermark information detector to calculate correlation values for all of a second one of the rows and columns.

* * * * *